US012548538B2

(12) United States Patent
Bauer et al.

(10) Patent No.: US 12,548,538 B2
(45) Date of Patent: Feb. 10, 2026

(54) SPATIAL MUSIC CREATION INTERFACE

(71) Applicant: Snap Inc., Santa Monica, CA (US)

(72) Inventors: Kristian Bauer, West Boylston, MA (US); Tiago Rafael Duarte, Marina Del Rey, CA (US); Terek Judi, Long Beach, CA (US); Shin Hwun Kang, Los Angeles, CA (US); Karen Stolzenberg, Venice, CA (US)

(73) Assignee: Snap Inc., Santa Monica, CA (US)

( * ) Notice: Subject to any disclaimer, the term of this patent is extended or adjusted under 35 U.S.C. 154(b) by 1044 days.

(21) Appl. No.: 17/454,949

(22) Filed: Nov. 15, 2021

(65) Prior Publication Data

US 2023/0154445 A1    May 18, 2023

(51) Int. Cl.
| | | |
|---|---|---|
| *G10H 1/00* | (2006.01) | |
| *G02B 27/01* | (2006.01) | |
| *G06T 19/00* | (2011.01) | |
| *G10H 1/46* | (2006.01) | |

(52) U.S. Cl.
CPC ......... *G10H 1/0008* (2013.01); *G02B 27/017* (2013.01); *G02B 27/0179* (2013.01); *G06T 19/006* (2013.01); *G10H 1/46* (2013.01); *G02B 2027/0187* (2013.01); *G10H 2220/081* (2013.01); *G10H 2220/106* (2013.01); *G10H 2220/321* (2013.01); *G10H 2240/175* (2013.01)

(58) Field of Classification Search
CPC .. G10H 1/0008; G10H 1/46; G10H 2220/081; G10H 2220/106; G10H 2220/321; G10H 2240/175; G02B 27/017; G02B 27/0179; G02B 2027/0187; G06T 19/006

USPC .......................................................... 84/609
See application file for complete search history.

(56) References Cited

U.S. PATENT DOCUMENTS

| | | | |
|---|---|---|---|
| 2011/0041059 A1 | 2/2011 | Amarasingham et al. | |
| 2011/0209597 A1* | 9/2011 | Usui .................... | G10H 1/0008 84/622 |
| 2015/0309703 A1* | 10/2015 | Robertson ............ | G10H 1/0025 715/716 |
| 2017/0091980 A1 | 3/2017 | Sebastian et al. | |
| 2019/0278379 A1* | 9/2019 | Gribetz ............... | G06F 3/04842 |
| 2021/0201530 A1 | 7/2021 | Cowburn et al. | |
| 2021/0241529 A1 | 8/2021 | Cowburn et al. | |
| 2021/0303075 A1 | 9/2021 | Cowburn et al. | |
| 2021/0306386 A1* | 9/2021 | Smith ..................... | H04L 65/61 |

* cited by examiner

*Primary Examiner* — Jeffrey Donels
*Assistant Examiner* — Philip G Scoles
(74) *Attorney, Agent, or Firm* — Schwegman Lundberg & Woessner, P.A.

(57) ABSTRACT

Disclosed is a method of providing a music creation interface using a head-mounted device, including displaying first and second geometric loops fixed relative to a location in the real world, the first and second geometric loops each including a plurality of beat indicators. The second geometric loop is spaced apart from the first geometric loop. An interface comprising a plurality of sound or note icons is displayed, and in response to receiving user selection to move a selected sound or note icon to a particular beat indicator on one of the geometric loops, the selected sound or note icon is displayed at the particular beat indicator. In use, the geometric loops are rotated relative to at least one play indicator, and the selected sound or note icon is rendered when it reaches the at least one play indicator.

20 Claims, 12 Drawing Sheets

SPATIAL MUSIC CREATION INTERFACE

TECHNICAL FIELD

The present disclosure relates generally to augmented reality devices and interfaces, and to collaborative augmented reality sessions for audio creation.

BACKGROUND

A head-worn device may be implemented with a transparent or semi-transparent display through which a user of the head-worn device can view the surrounding environment. Such devices enable a user to see through the transparent or semi-transparent display to view the surrounding environment, and to also see objects (e.g., virtual objects such as 3D renderings, images, video, text, and so forth) that are generated for display to appear as a part of, and/or overlaid upon, the surrounding environment. This is typically referred to as "augmented reality."

A head-worn device may additionally completely occlude a user's visual field and display a virtual environment through which a user may move or be moved. This is typically referred to as "virtual reality." As used herein, the term "augmented reality" or "AR" refers to both augmented reality and virtual reality as traditionally understood, unless the context indicates otherwise.

A user of the head-worn device may access a messaging or social network application to view or share content with other users of the application. In some cases, live or stored content can be viewed and enhanced or modified by the user. That is, images, video or other media for enhancement can be captured from a live camera or can be retrieved from local or remote data storage.

As referred to herein, the phrase "augmented reality experience," includes or refers to various image processing operations corresponding to an image modification, filter, media overlay, transformation, and the like, as described further herein. In some examples, these image processing operations provide an interactive experience of a real-world environment, where objects, surfaces, backgrounds, lighting and so forth in the real world are enhanced by computer-generated perceptual information. In this context an "augmented reality effect" comprises the collection of data, parameters, and other assets needed to apply a selected augmented reality experience to an image or a video feed. In some examples, augmented reality effects are provided by Snap, Inc. under the registered trademark LENSES.

In some examples, an augmented reality effect includes augmented reality (or "AR") content configured to modify or transform image data presented within a GUI of the head-worn device in some way. For example, complex additions or transformations to the content images may be performed using AR effect data, such as adding rabbit ears to the head of a person, adding floating hearts with background coloring, altering the proportions of a person's features, adding enhancements to landmarks in a scene being viewed on a head-worn device or many numerous other such transformations. This includes both real-time modifications that modify an image as it is captured using a camera associated with the head-worn device, which is then displayed by the head-worn device with the AR effect modifications, as well as modifications to stored content, such as video clips in a gallery that may be modified using AR effects. Similarly, real-time video capture may be used with an AR effect to show to a user of a head-worn device how video images currently being captured by sensors of a device would modify the captured data. Such data may simply be displayed on the screen and not stored in memory, the content captured by the device sensors may be recorded and stored in memory with or without the AR effect modifications (or both), or the content captured by the device sensors may be transmitted, with the AR effect modification, over the network 102 to a server or another device.

AR effects and associated systems and modules for modifying content using AR effects may thus involve detection of objects (e.g., faces, hands, bodies, cats, dogs, surfaces, objects), tracking of such objects as they leave, enter, and move around the field of view in video frames, and the modification or transformation of such objects as they are tracked. In various examples, different methods for achieving such transformations may be used. For example, some examples may involve generating a 3D mesh model of the object or objects, and using transformations and animated textures of the model within the video to achieve the transformation. In other examples, tracking of points on an object may be used to place an image or texture, which may be two dimensional or three dimensional, at the tracked position. In still further examples, neural network analysis of video frames may be used to place images, models, or textures in content (e.g., images or frames of video). AR effect data thus may include both the images, models, and textures used to create transformations in content, as well as additional modeling and analysis information needed to achieve such transformations with object detection, tracking, and placement.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
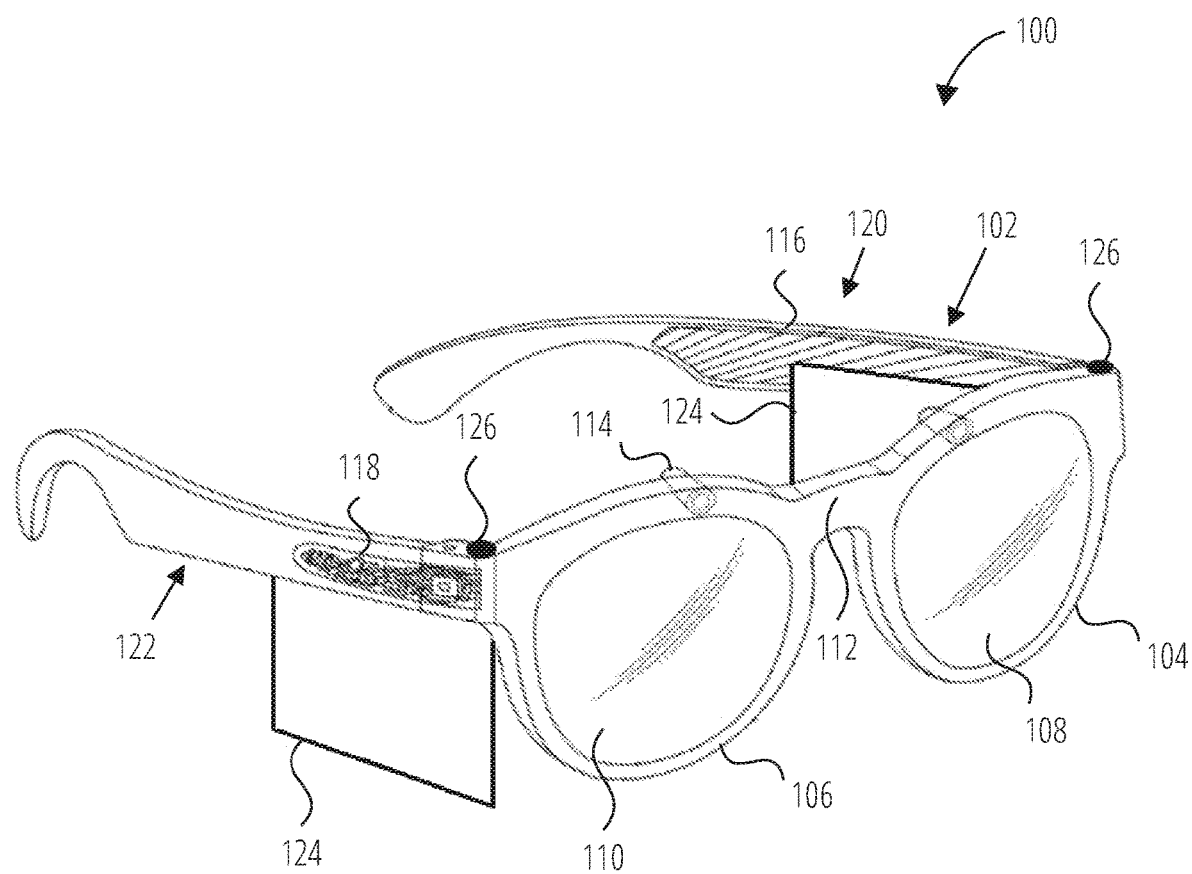
FIG. 1 is a perspective view of a head-worn device, in accordance with some examples.

Known head-worn devices, such as AR spectacles, include a transparent or semi-transparent display that enables a user to see through the transparent or semi-transparent display to view the surrounding environment. Additional information or objects (e.g., virtual objects such as 3D renderings, images, video, text, and so forth) are shown on the display and appear as a part of, and/or overlaid upon, the surrounding environment to provide an augmented reality experience for the user. The display may for example include a waveguide that receives a light beam from a projector but any appropriate display for presenting augmented or virtual content to the wearer may be used.

AR spectacles can be used to create a shared environment in which a virtual object is positioned in a fixed location in the real world, viewable from the point of view of each of the users who are participating in the shared environment. The participants can then collaborate or compete in the shared environment. In some examples, a shared AR session in which a plurality of users via client devices can participate is hosted on a system that includes multiple head-worn devices, associated mobile devices and networked resources. The experience is synchronized and shared between the users, such that the actions of one user in the shared AR session can be synchronized and broadcast to the other users.

In some examples, a method of providing a music creation interface, executed by one or more processors in a head-worn device system including one or more display devices is provided. The method includes displaying a first geometric loop fixed relative to a location in the real world, the first geometric loop including a plurality of beat indicators, displaying a second geometric loop fixed relative to the location in the real world, the second geometric loop including a plurality of beat indicators and being spaced apart from the first geometric loop, displaying an interface includes a plurality of audio icons, receiving user selection to move a selected audio icon to a particular beat indicator on at least one of the first and second geometric loops, and displaying the selected audio icon at the particular beat indicator.

The method may also include rotating the first and second geometric loops and at least one play indicator relative to each other, and rendering a sound or note corresponding to the selected audio icon when the at least one play indicator is at the particular beat indicator or the selected audio icon. A joint augmented reality session may be initiated between a first head-mounted device and a second head-mounted device, the method further including displaying the first geometric loop via the first head-mounted device and the second head-mounted device in a fixed frame of reference fixed relative to the location in the real world, displaying the second geometric loop via the first head-mounted device and the second head-mounted device in the fixed frame of reference fixed relative to the location in the real world, detecting movement of the first head-mounted device and the second head-mounted device, and updating the display of the first geometric loop and the second geometric loop to account for the movement of the first head-mounted device and the second head-mounted device such that the first geometric loop and the second geometric loop appear to be stationary in the fixed frame of reference.

The method may also include determining a relative position and orientation between the music creation interface and the head-worn device system, and rendering audio corresponding to the selected audio icon in at least two speakers based on the relative position and orientation of the music creation interface and the head-worn device system. The at least one play indicator may remain stationary relative to the location in the real world while the first and second geometric loops rotate relative to the location in the real world. The first and second geometric loops may also remain stationary relative to the location in the real world while the at least one play indicator moves around the geometric loops.

A volume of the rendering of the audio may be changed depending on a perceived distance between the music creation interface and the head-worn device system, and the audio may be panned depending on the relative orientation between the music creation interface and the head-worn device system.

Also provided is a head-worn device system comprising one or more cameras one or more display devices, one or more processors; and a memory storing instructions that, when executed by the one or more processors, configure the system to perform operations to provide a music creation interface corresponding to the methods and features described above, including but not limited to displaying a first geometric loop fixed relative to a location in the real world, the first geometric loop including a plurality of beat indicators, displaying a second geometric loop fixed relative to the location in the real world, the second geometric loop including a plurality of beat indicators and being spaced apart from the first geometric loop, displaying an interface comprising a plurality of audio icons, receiving user selection to move a selected audio icon to a particular beat indicator on at least one of the first and second geometric loops, and displaying the selected audio icon at the particular beat indicator.

Also provided is a non-transitory computer-readable storage medium, the computer-readable storage medium including instructions that when executed by a head-worn device system including one or more display devices, cause the head-worn device system to perform operations to provide a music creation interface corresponding to the methods and features described above, including but not limited to, displaying a first geometric loop fixed relative to a location in the real world, the first geometric loop including a plurality of beat indicators, displaying a second geometric loop fixed relative to the location in the real world, the second geometric loop including a plurality of beat indicators and being spaced apart from the first geometric loop, displaying an interface includes a plurality of audio icons, receiving user selection to move a selected audio icon to a particular beat indicator on at least one of the first and second geometric loops, and displaying the selected audio icon at the particular beat indicator.

Other technical features may be readily apparent to one skilled in the art from the following figures, descriptions, and claims.

FIG. 1 is perspective view of a head-worn device (e.g., glasses 100), in accordance with some examples. The glasses 100 can include a frame 102 made from any suitable material such as plastic or metal, including any suitable shape memory alloy. In one or more examples, the frame 102 includes a first or left optical element holder 104 (e.g., a display or lens holder) and a second or right optical element holder 106 connected by a bridge 112. A first or left optical element 108 and a second or right optical element 110 can be provided within respective left optical element holder 104 and right optical element holder 106. Each of the right optical element 110 and the left optical element 108 can be a lens, a display, a display assembly, or a combination of the foregoing. Any suitable display assembly can be provided in the glasses 100.

The frame 102 additionally includes a left arm or temple piece 120 and a right arm or temple piece 122. In some examples the frame 102 can be formed from a single piece of material so as to have a unitary or integral construction.

The glasses 100 can include a computing device, such as a computer 118, which can be of any suitable type so as to be carried by the frame 102 and, in one or more examples, of a suitable size and shape, so as to be at least partially disposed in one of the temple piece 120 or the temple piece 122. The computer 118 can include one or more processors with memory, wireless communication circuitry, and a power source. As discussed below, the computer 118 comprises low-power circuitry, high-speed circuitry, and a display processor. Various other examples may include these elements in different configurations or integrated together in different ways. Additional details of aspects of computer 118 may be implemented as illustrated by the data processor 302 discussed below.

The computer 118 additionally includes a battery 116 or other suitable portable power supply. In some examples, the battery 116 is disposed in left temple piece 120 and is electrically coupled to the computer 118 disposed in the right temple piece 122. The glasses 100 can include a connector or port (not shown) suitable for charging the battery 116, a wireless receiver, transmitter or transceiver (not shown), or a combination of such devices.

The glasses 100 include cameras 114. Although two cameras are depicted, other examples contemplate the use of a single or additional (i.e., more than two) cameras. In one or more examples, the glasses 100 include any number of input sensors or other input/output devices in addition to the camera 114. Such sensors or input/output devices can additionally include biometric sensors, location sensors, motion sensors, and so forth.

The glasses 100 may also include a touchpad 124 mounted to or integrated with one or both of the left temple piece 120 and right temple piece 122. The touchpad 124 is generally vertically-arranged, approximately parallel to a user's temple in some examples. As used herein, generally vertically aligned means that the touchpad is at least more vertical than horizontal, although potentially more vertical than that. Additional user input may be provided by one or more buttons 126, which in the illustrated examples are provided on the outer upper edges of the left optical element holder 104 and right optical element holder 106. The one or more touchpads 124 and buttons 126 provide a means whereby the glasses 100 can receive input from a user of the glasses 100.

Figure 2:
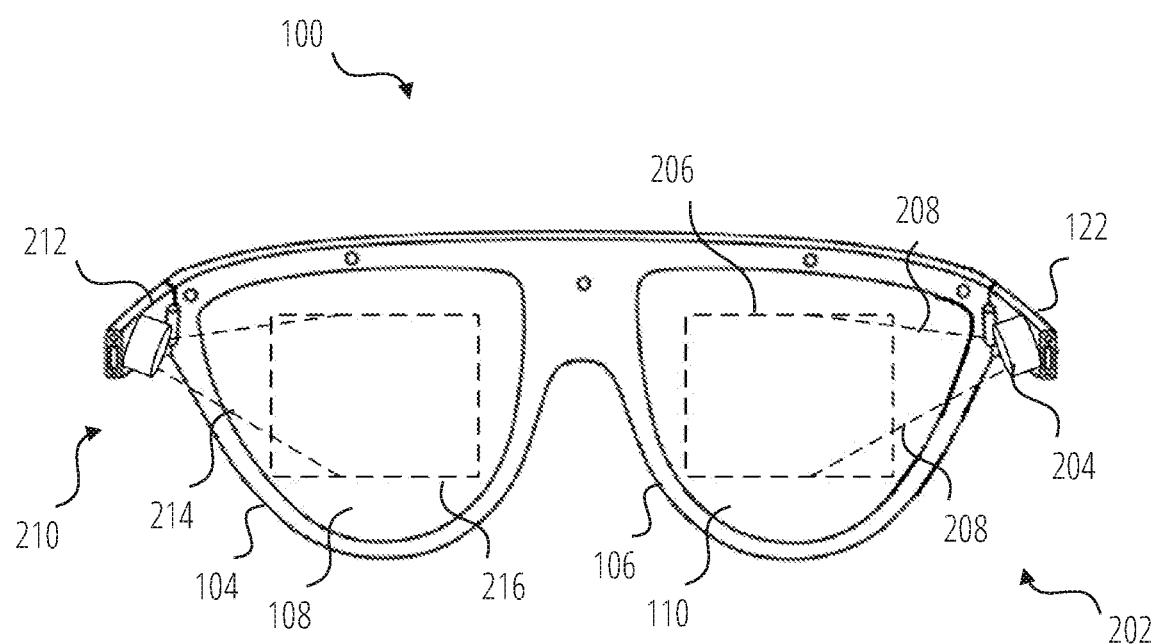
FIG. 2 illustrates a further view of the head-worn device of FIG. 1, in accordance with some examples.

FIG. 2 illustrates the glasses 100 from the perspective of a wearer. For clarity, a number of the elements shown in FIG. 1 have been omitted. As described in FIG. 1, the glasses 100 shown in FIG. 2 include left optical element 108 and right optical element 110 secured within each of the left optical element holder 104 and the right optical element holder 106 respectively.

The glasses 100 include forward optical assembly 202 comprising a right projector 204 and a right near eye display 206, and a forward optical assembly 210 comprising a left projector 212 and a near eye display 216.

In some examples, the near eye displays are waveguides. The waveguides include reflective or diffractive structures (e.g., gratings and/or optical elements such as mirrors, lenses, or prisms). Light 208 emitted by the projector 204 encounters the diffractive structures of the waveguide of the near eye display 206, which directs the light towards the right eye of a user to provide an image on or in the right optical element 110 that overlays the view of the real world seen by the user. Similarly, light 214 emitted by the projector 212 encounters the diffractive structures of the waveguide of the near eye display 216, which directs the light towards the left eye of a user to provide an image on or in the left optical element 108 that overlays the view of the real world seen by the user.

It will be appreciated however that other display technologies or configurations may be provided that can display an image to a user in a forward field of view. For example, instead of a projector 204 and a waveguide, an LCD, LED or other display panel or surface may be provided instead.

In use, a wearer of the glasses 100 will be presented with information, content and various user interfaces on the near eye displays. As described in more detail below, the user can then interact with the glasses 100 using a touchpad 124 and/or the buttons 126, in addition to providing voice inputs or touch inputs on an associated device, for example client device 328 illustrated in FIG. 3.

Figure 3:
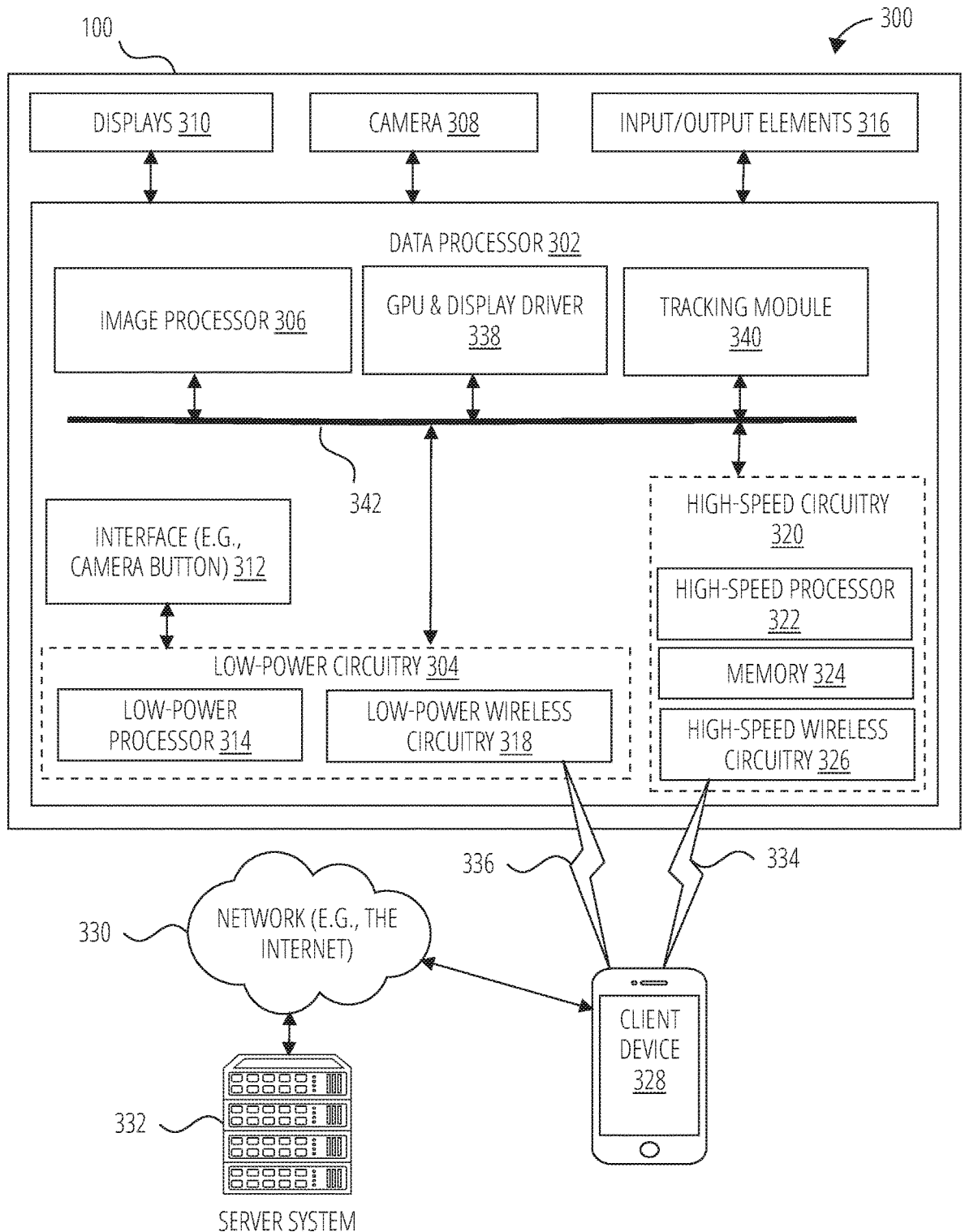
FIG. 3 is a block diagram illustrating a networked system 300 including details of the head-worn device of FIG. 1, in accordance with some examples.

FIG. 3 is a block diagram illustrating a networked system 300 including details of the glasses 100, in accordance with some examples.

The networked system 300 includes the glasses 100, a client device 328, and a server system 332. The client device 328 may be a smartphone, tablet, phablet, laptop computer, access point, or any other such device capable of connecting with the glasses 100 using both a low-power wireless connection 336 and a high-speed wireless connection 334. The client device 328 is connected to the server system 332 via the network 330. The network 330 may include any combination of wired and wireless connections. The server system 332 may be one or more computing devices as part of a service or network computing system. The client device 328 and any elements of the server system 332 and network 330 may be implemented using details of the software architecture 1304 or the machine 1400 described in FIG. 13 and FIG. 14.

The glasses 100 include a data processor 302, displays 310, one or more cameras 308, and additional input/output elements 316. The input/output elements 316 may include microphones, audio speakers, biometric sensors, additional sensors, or additional display elements integrated with the data processor 302. Examples of the input/output elements 316 are discussed further with respect to FIG. 13 and FIG. 14. For example, the input/output elements 316 may include any of I/O components 1406 including output components 1428, motion components 1436, and so forth. Examples of the displays 310 are discussed in FIG. 2. In the particular examples described herein, the displays 310 include a display for each one of a user's left and right eyes.

The data processor 302 includes an image processor 306 (e.g., a video processor), a GPU & display driver 338, a tracking module 340, an interface 312, low-power circuitry 304, and high-speed circuitry 320. The components of the data processor 302 are interconnected by a bus 342.

The interface 312 refers to any source of a user command that is provided to the data processor 302. In one or more examples, the interface 312 is a physical button that, when depressed, sends a user input signal from the interface 312 to a low-power processor 314. A depression of such button followed by an immediate release may be processed by the low-power processor 314 as a request to capture a single image, or vice versa. A depression of such a button for a first period of time may be processed by the low-power processor 314 as a request to capture video data while the button is depressed, and to cease video capture when the button is released, with the video captured while the button was depressed stored as a single video file. Alternatively, depression of a button for an extended period of time may capture a still image. In some examples, the interface 312 may be any mechanical switch or physical interface capable of accepting user inputs associated with a request for data from the camera 308. In other examples, the interface 312 may have a software component, or may be associated with a command received wirelessly from another source, such as from the client device 328.

The image processor 306 includes circuitry to receive signals from the camera 308 and process those signals from the camera 308 into a format suitable for storage in the memory 324 or for transmission to the client device 328. In one or more examples, the image processor 306 (e.g., video processor) comprises a microprocessor integrated circuit (IC) customized for processing sensor data from the camera 308, along with volatile memory used by the microprocessor in operation.

The low-power circuitry 304 includes the low-power processor 314 and the low-power wireless circuitry 318. These elements of the low-power circuitry 304 may be implemented as separate elements or may be implemented on a single IC as part of a system on a single chip. The low-power processor 314 includes logic for managing the other elements of the glasses 100. As described above, for example, the low-power processor 314 may accept user input signals from the interface 312. The low-power processor 314 may also be configured to receive input signals or instruction communications from the client device 328 via the low-power wireless connection 336. The low-power wireless circuitry 318 includes circuit elements for implementing a low-power wireless communication system. Bluetooth™ Smart, also known as Bluetooth™ low energy, is one standard implementation of a low power wireless communication system that may be used to implement the low-power wireless circuitry 318. In other examples, other low power communication systems may be used.

The high-speed circuitry 320 includes a high-speed processor 322, a memory 324, and a high-speed wireless circuitry 326. The high-speed processor 322 may be any processor capable of managing high-speed communications and operation of any general computing system needed for the data processor 302. The high-speed processor 322 includes processing resources needed for managing high-speed data transfers on the high-speed wireless connection 334 using the high-speed wireless circuitry 326. In certain examples, the high-speed processor 322 executes an operating system such as a LINUX operating system or other such operating system such as the operating system 1312 of FIG. 13. In addition to any other responsibilities, the high-speed processor 322 executing a software architecture for the data processor 302 is used to manage data transfers with the high-speed wireless circuitry 326. In certain examples, the high-speed wireless circuitry 326 is configured to implement Institute of Electrical and Electronic Engineers (IEEE) 802.11 communication standards, also referred to herein as Wi-Fi. In other examples, other high-speed communications standards may be implemented by the high-speed wireless circuitry 326.

The memory 324 includes any storage device capable of storing camera data generated by the camera 308 and the image processor 306. While the memory 324 is shown as integrated with the high-speed circuitry 320, in other examples, the memory 324 may be an independent standalone element of the data processor 302. In certain such examples, electrical routing lines may provide a connection through a chip that includes the high-speed processor 322 from image processor 306 or the low-power processor 314 to the memory 324. In other examples, the high-speed processor 322 may manage addressing of the memory 324 such that the low-power processor 314 will boot the high-speed processor 322 any time that a read or write operation involving the memory 324 is needed.

The tracking module 340 estimates a pose of the glasses 100. For example, the tracking module 340 uses image data and corresponding inertial data from the camera 308 and the position components 1440, as well as GPS data, to track a location and determine a pose of the glasses 100 relative to a frame of reference (e.g., real-world environment). The tracking module 340 continually gathers and uses updated sensor data describing movements of the glasses 100 to determine updated three-dimensional poses of the glasses 100 that indicate changes in the relative position and orientation relative to physical objects in the real-world environment. The tracking module 340 permits visual placement of virtual objects relative to physical objects by the glasses 100 within the field of view of the user via the displays 310.

The GPU & display driver 338 may use the pose of the glasses 100 to generate frames of virtual content or other content to be presented on the displays 310 when the glasses 100 are functioning in a traditional augmented reality mode. In this mode, the GPU & display driver 338 generates updated frames of virtual content based on updated three-dimensional poses of the glasses 100, which reflect changes in the position and orientation of the user in relation to physical objects in the user's real-world environment.

One or more functions or operations described herein may also be performed in an application resident on the glasses 100 or on the client device 328, or on a remote server. For example, one or more functions or operations described herein may be performed by one of the applications 1306 such as messaging application 1346.

Figure 4:
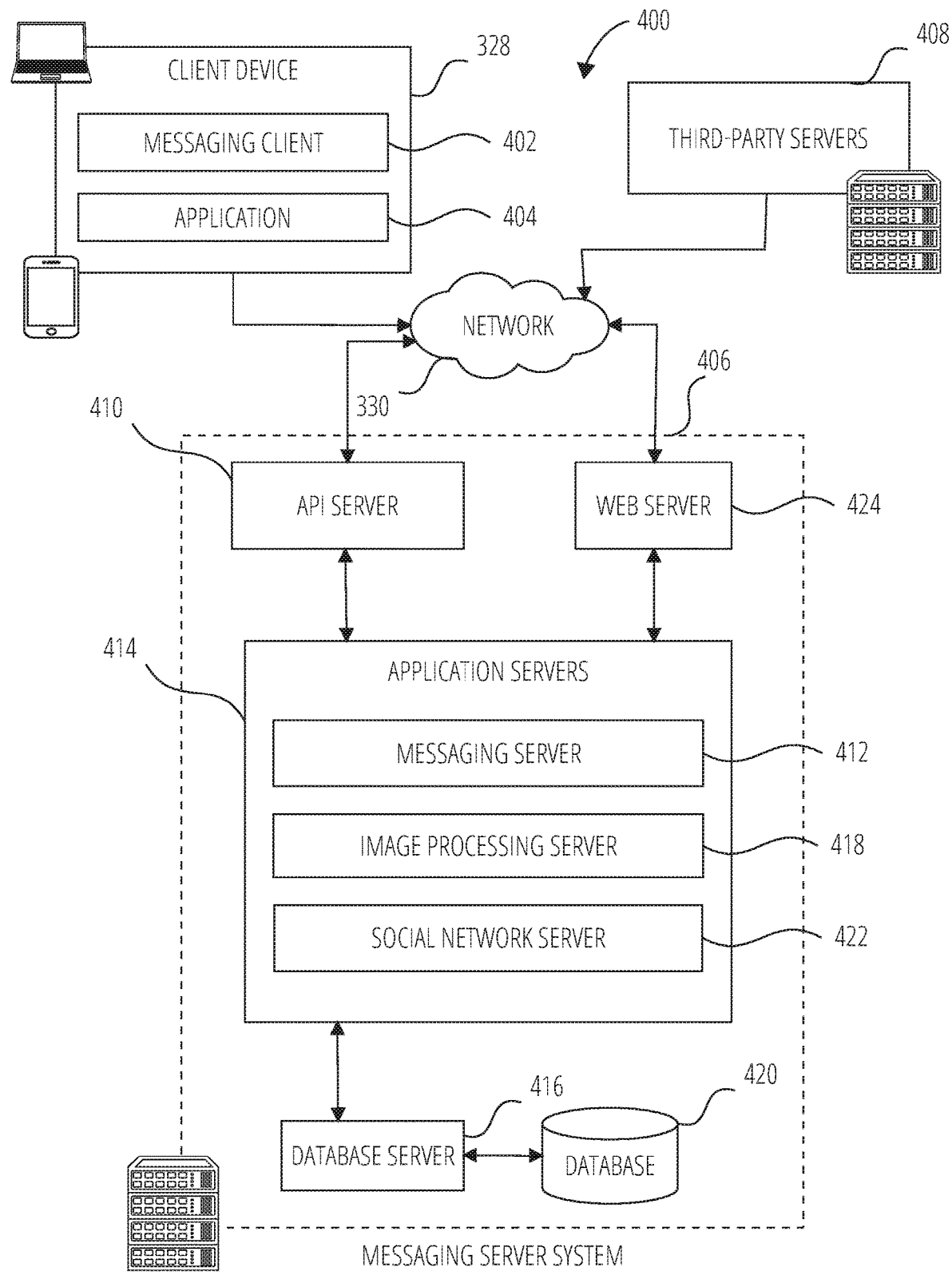
FIG. 4 is a diagrammatic representation of a networked environment in which the present disclosure may be deployed, in accordance with some examples.

FIG. 4 is a block diagram showing an example messaging system 400 for exchanging data (e.g., messages and associated content) over a network. The messaging system 400 includes multiple instances of a client device 328, each of which hosts a number of applications, including a messaging client 402 and other applications 404. Each messaging client 402 is communicatively coupled to other instances of the messaging client 402 (e.g., hosted on respective other client devices 328), a messaging server system 406 and third-party servers 408 via a network 330 (e.g., the Internet). A messaging client 402 can also communicate with locally-hosted applications 404 using Applications Program Interfaces (APIs).

A messaging client 402 is able to communicate and exchange data with other messaging clients 402 and with the messaging server system 406 via the network 330. The data exchanged between messaging clients 402, and between a messaging client 402 and the messaging server system 406, includes functions (e.g., commands to invoke functions) as well as payload data (e.g., text, audio, video or other multimedia data).

The messaging server system 406 provides server-side functionality via the network 330 to a particular messaging client 402. While certain functions of the messaging system 400 are described herein as being performed by either a messaging client 402 or by the messaging server system 406, the location of certain functionality either within the messaging client 402 or the messaging server system 406 may be a design choice. For example, it may be technically preferable to initially deploy certain technology and functionality within the messaging server system 406 but to later migrate this technology and functionality to the messaging client 402 where a client device 328 has sufficient processing capacity.

The messaging server system 406 supports various services and operations that are provided to the messaging client 402. Such operations include transmitting data to, receiving data from, and processing data generated by the messaging client 402. This data may include message content, client device information, geolocation information, media augmentation and overlays, message content persistence conditions, social network information, and live event information, as examples. Data exchanges within the messaging system 400 are invoked and controlled through functions available via user interfaces (UIs) of the messaging client 402.

Turning now specifically to the messaging server system 406, an Application Program Interface (API) server 410 is coupled to, and provides a programmatic interface to, application servers 414. The application servers 414 are communicatively coupled to a database server 416, which facilitates access to a database 420 that stores data associated with messages processed by the application servers 414. Similarly, a web server 424 is coupled to the application servers 414, and provides web-based interfaces to the application servers 414. To this end, the web server 424 processes incoming network requests over the Hypertext Transfer Protocol (HTTP) and several other related protocols.

The Application Program Interface (API) server 410 receives and transmits message data (e.g., commands and message payloads) between the client device 328 and the application servers 414. Specifically, the Application Program Interface (API) server 410 provides a set of interfaces (e.g., routines and protocols) that can be called or queried by the messaging client 402 in order to invoke functionality of the application servers 414. The Application Program Interface (API) server 410 exposes various functions supported by the application servers 414, including account registration, login functionality, the sending of messages, via the application servers 414, from a particular messaging client 402 to another messaging client 402, the sending of media files (e.g., images or video) from a messaging client 402 to a messaging server 412, and for possible access by another messaging client 402, the settings of a collection of media data (e.g., story), the retrieval of a list of friends of a user of a client device 328, the retrieval of such collections, the retrieval of messages and content, the addition and deletion of entities (e.g., friends) to an entity graph (e.g., a social graph), the location of friends within a social graph, and opening an application event (e.g., relating to the messaging client 402).

The application servers 414 host a number of server applications and subsystems, including for example a messaging server 412, an image processing server 418, and a social network server 422. The messaging server 412 implements a number of message processing technologies and functions, particularly related to the aggregation and other processing of content (e.g., textual and multimedia content) included in messages received from multiple instances of the messaging client 402. As will be described in further detail, the text and media content from multiple sources may be aggregated into collections of content (e.g., called stories or galleries). These collections are then made available to the messaging client 402. Other processor and memory intensive processing of data may also be performed server-side by the messaging server 412, in view of the hardware requirements for such processing.

The application servers 414 also include an image processing server 418 that is dedicated to performing various image processing operations, typically with respect to images or video within the payload of a message sent from or received at the messaging server 412.

The social network server 422 supports various social networking functions and services and makes these functions and services available to the messaging server 412. To this end, the social network server 422 maintains and accesses an entity graph within the database 420. Examples of functions and services supported by the social network server 422 include the identification of other users of the messaging system 400 with which a particular user has relationships or is "following," and also the identification of other entities and interests of a particular user.

Returning to the messaging client 402, features and functions of an external resource (e.g., an application 404 or applet) are made available to a user via an interface of the messaging client 402. In this context, "external" refers to the fact that the application 404 or applet is external to the messaging client 402. The external resource is often provided by a third party but may also be provided by the creator or provider of the messaging client 402. The messaging client 402 receives a user selection of an option to launch or access features of such an external resource. The external resource may be the application 404 installed on the client device 328 (e.g., a "native app"), or a small-scale version of the application (e.g., an "applet") that is hosted on the client device 328 or remote of the client device 328 (e.g., on third-party servers 408). The small-scale version of the application includes a subset of features and functions of the application (e.g., the full-scale, native version of the application) and is implemented using a markup-language document. In some examples, the small-scale version of the application (e.g., an "applet") is a web-based, markup-language version of the application and is embedded in the messaging client 402. In addition to using markup-language documents (e.g., a .*ml file), an applet may incorporate a scripting language (e.g., a .*js file or a json file) and a style sheet (e.g., a .*ss file).

In response to receiving a user selection of the option to launch or access features of the external resource, the messaging client 402 determines whether the selected external resource is a web-based external resource or a locally-installed application 404. In some cases, applications 404 that are locally installed on the client device 328 can be launched independently of and separately from the messaging client 402, such as by selecting an icon, corresponding to the application 404, on a home screen of the client device 328. As used herein, an icon can include one or both of text and graphic elements. Small-scale versions of such applications can be launched or accessed via the messaging client 402 and, in some examples, no or limited portions of the small-scale application can be accessed outside of the messaging client 402. The small-scale application can be launched by the messaging client 402 receiving, from a third-party server 408 for example, a markup-language document associated with the small-scale application and processing such a document.

In response to determining that the external resource is a locally-installed application 404, the messaging client 402 instructs the client device 328 to launch the external resource by executing locally-stored code corresponding to the external resource. In response to determining that the external resource is a web-based resource, the messaging client 402 communicates with the third-party servers 408 (for example) to obtain a markup-language document corresponding to the selected external resource. The messaging client 402 then processes the obtained markup-language document to present the web-based external resource within a user interface of the messaging client 402.

The messaging client 402 can notify a user of the client device 328, or other users related to such a user (e.g., "friends"), of activity taking place in one or more external resources. For example, the messaging client 402 can provide participants in a conversation (e.g., a chat session) in the messaging client 402 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective messaging clients 402, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 402. The external resource can selectively include different media items in the responses, based on a current context of the external resource.

Figure 5:
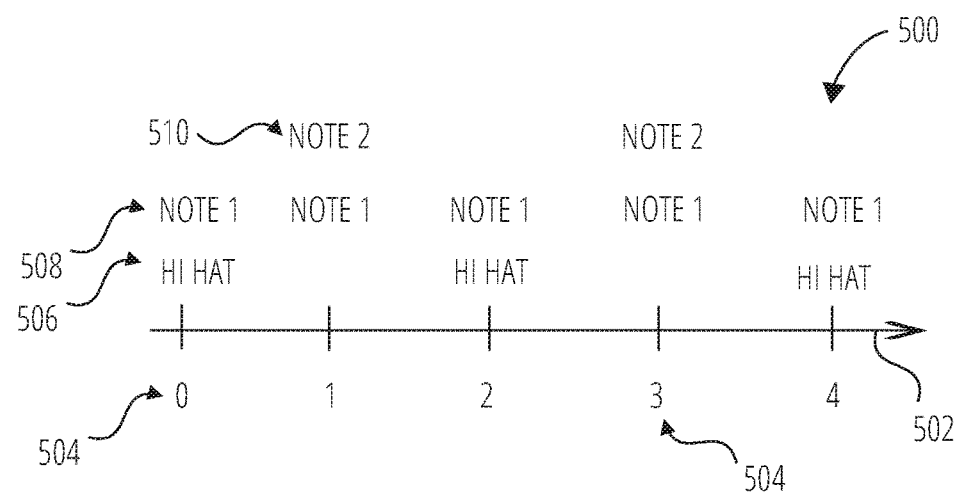
FIG. 5 illustrates an interface for music composition based on a grid of beats, in accordance with some examples.

FIG. 5 illustrates an interface for music composition based on a grid of beats. As can be seen, a composing interface 500 includes a time axis 502 that is divided into a series of time increments or beats 504. Different sounds or notes can be placed by the composer above selected beats in a number of tracks, such as track one 506, track two 508 and track three 510. Typically, when the composition is played, an indicator will sweep from left to right along the grid and the sounds or notes or percussion indicated in each track will be played at the appropriate beat.

Figures 6A, 6B:
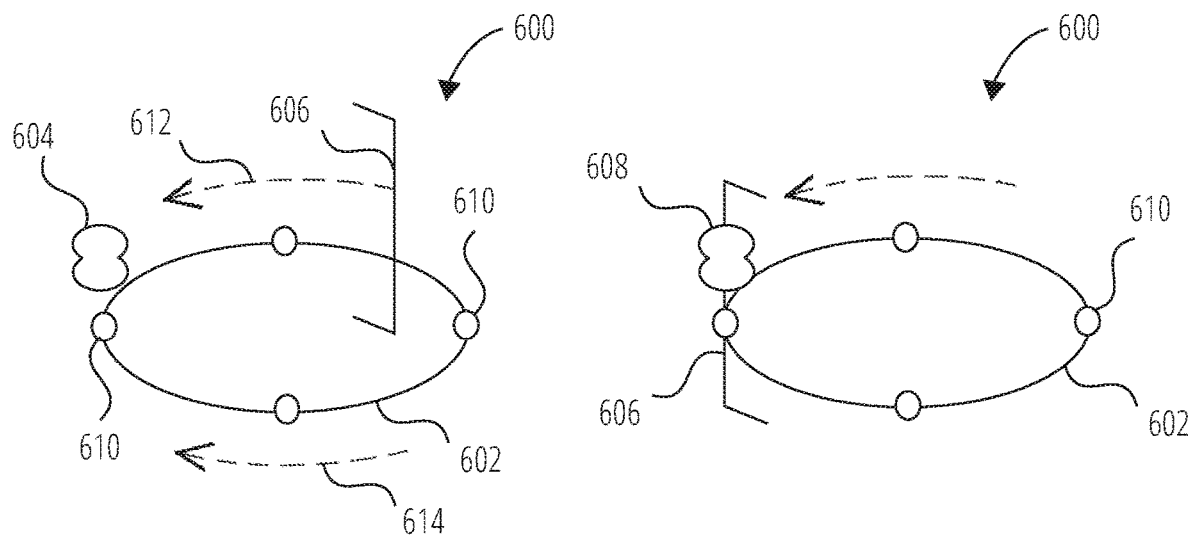
FIG. 6A illustrates an interface for music creation based on a geometric loop, which can be used in a collaborative three-dimensional creation interface, in accordance with some examples.
FIG. 6B illustrates the interface of FIG. 6A during playback, in accordance with some examples.

FIG. 6A illustrates an interface for music creation based on a geometric time loop, which can be used in a collaborative three-dimensional composition interface as discussed further below. In this case, a music creation interface 600 includes at least one geometric loop 602 that is divided into a series of time increments illustrated by beat indicators 610. Different sounds or notes can be placed by the composer above selected beat indicators 610 in the geometric loop 602. In this case, notes or sounds are represented by three-dimensional virtual objects whose appearance (shape, color, texture and so forth) serve to identify the particular sound or note. In FIG. 6, a note or sound, as represented by note shape 604 has been placed over one of the beat indicators 610.

Also shown is a playback indicator 606 indicating the current play time around the geometric loop 602. The playback indicator 606 will be stationary at a start position (or other position around the geometric loop 602 if the creation has been paused) on the geometric loop 602 and when playback starts or resumes, the playback indicator 606 will move relative to and around the geometric loop 602. In some examples, the playback indicator 606 sweeps around a stationary geometric loop 602 in the direction indicated by arrow 612. Alternatively, the geometric loop 602 could rotate through or past a stationary playback indicator 606 in the direction shown by arrow 614, or a combination of the two movements, as perceived by the composers, can be provided.

The playback indicator 606 in the example is an animating piece of geometry-a vertical bar that is animated around the loops to indicate active playback. In another example, a visual effect could be provided over the geometric loop 602 such as a material shader that animates over the top of the loop's geometry or on a note shape 604 as the play indicator, to indicate active moving time on top of the loop geometry or the note shapes.

FIG. 6B illustrates the interface of FIG. 6A during playback in some examples. As can be seen, when the composition is played the sounds or notes or percussion indicated by the note shape(s) (e.g., note shape 608) in the geometric loop 602 will be played at the appropriate time when that beat indicator is reached by the playback indicator 606 as it moves around the geometric loop 602.

Although FIG. 6A and FIG. 6B show only one note shape 604 above one of the beat indicators 610, note shapes can be stacked one above the other over a particular beat indicator so that more than one note or sound is played when that beat is reached by the play indicator 914. Alternatively, multiple loops having the same number of beat indicators could be provided. Also, when viewed directly from above, the geometric loop 602 is circular. In the figures, geometric loops are shown as ellipses, since this is typically how they will be viewed (as circles seen in perspective view) by the participants in the shared AR session. Other geometric loop shapes could of course be provided. The term "geometric loop" is used herein to distinguish over logical or programming or other loops, but it will be appreciated that while the loop can be a geometric figure, an irregular or other planar or non-planar loop shape may be used.

Figure 7:
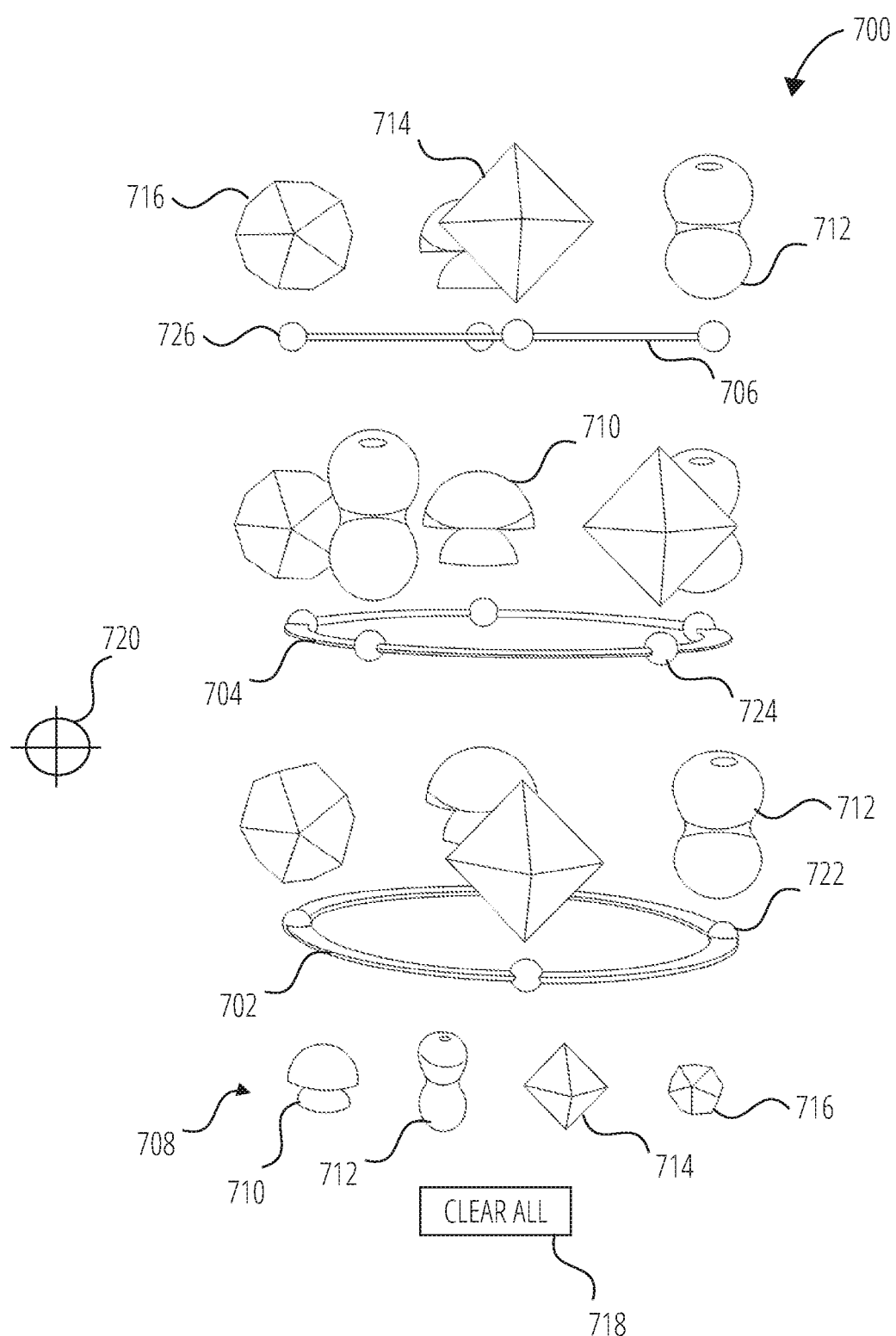
FIG. 7 illustrates an interface for music creation based on the geometric loop illustrated in FIG. 6A and FIG. 6B, in accordance with some examples.

FIG. 7 illustrates an interface for music creation based on the geometric loop illustrated in FIG. 6A and FIG. 6B. The interface, referred to as music creation interface 700, comprises a number of stacked geometric loops, including bottom loop 702, middle loop 704 and top loop 706 in the illustrated example. More or less geometric loops could of course be provided. Also shown is a far-field reticle 720 that is displayed by the glasses 100 to assist with selection of note shapes as discussed in more detail below. Movement of the reticle 720 in the display can be effected by movement of a user's finger on the touchpad 124 or the position of the reticle 720 can depend on movement of the participant's head or a combination of both. Each participant in the shared session is provided with their own reticle 720 via the displays 310 of the glasses 100.

Located at the bottom of the music creation interface 700 is a note selection interface 708 including a number of unique note shapes each representing a different sound or note, including note shape 710, note shape 712, note shape 714 and note shape 716. In some examples, the note shapes in the note selection interface 708 are a grey or other bland color until they are selected by a participant using the reticle 720 or by gesture recognition based on the glasses 100 recognizing a hand or figure in the field of view of the glasses 100 at a position corresponding to one of the note shapes. Included in the note selection interface 708 is a "clear all" interface 718 that can be used to remove all note shapes positioned on one of the loops. In some examples, the note selection interface 708 is shared with all participants, in which case it appears in a stationary and consistent position in a real world frame of reference and can be acted upon by any of the participants, while in another example each participant is shown their own note selection interface 708, in which case each note selection interface 708 is only visible to that participant and can rotate to face the participant as the participant moves around the music creation interface 700.

As shown in the figure, in this example the bottom loop 702, middle loop 704 and top loop 706 are the same size and are stacked one above the other so that they share a common central axis. Each of the loops includes a number of beat indicators 610, with bottom loop 702 including four beat indicators 722, middle loop 704 including five beat indicators 724 and top loop 706 including four beat indicators 726 in this example. The increment of time between each beat on all of the rings is the same in this example, but of course different time increments can be provided on any or all of the rings.

Since bottom loop 702 has four beat indicators 722 and the middle loop 704 has five beat indicators 724, during playback in this case the playback indicators 606 (not shown in this figure) will reach the first beat in bottom loop 702 again, to restart bottom loop 702, when the playback indicator 606 reaches the fifth beat in middle loop 704. The loops and playback indicators 606 can thus become offset from one another during playback depending on the particular configuration and number of beat indicators. In another example, loops can be of the same duration but with different numbers of beat indicators, in which case the loops will not become offset during playback. For example, one four second loop could have eight beat indicators while another four second loop could have four beat indicators.

Note shapes that have been selected and placed on each loop are shown located above a corresponding beat in each loop. For example, bottom loop 702 includes note shape 712 on beat one, middle loop 704 includes note shape 710 on beat two, while top loop 706 includes note shape 716 on beat three and note shape 714 on beat four.

In some examples, the glasses 100 provide smart targeting of the reticle 720 for selection of a note shape in note selection interface 708 or on one of the loops. If the participant looks away from the music creation interface 700 then the reticle will fade out and vice versa. As the reticle approaches one of the note shapes, the glasses 100 can snap the reticle 720 to that note shape. Initial selection of the note shape can be indicated by a change in color of the note shape or by other visual effects, such as by providing a glow effect. Selection of that note shape can then be confirmed by receipt of a tap on the touchpad 124. In the case of a note shape on a loop, a note shape to which the reticle has snapped can be deleted with a long press on the touchpad, or selected for movement to another location with a tap, and dropped at the new location with a further tap.

The music creation interfaces as described herein can be used in a number of different ways. In some examples, the music creation interface can be used to compose and play back musical compositions. In other examples, the music creation interface can be considered as a musical instrument that can be played live by a user to create a musical performance. In other examples, the music creation interface can be considered as a musical instrument or device on which a number of users can play collaboratively in a live performance or jam session. In the latter cases in particular, note shapes can be added to and removed from the loops at will by one or more users as the playback indicator 606 rotates with respect to the loops.

Figure 8:
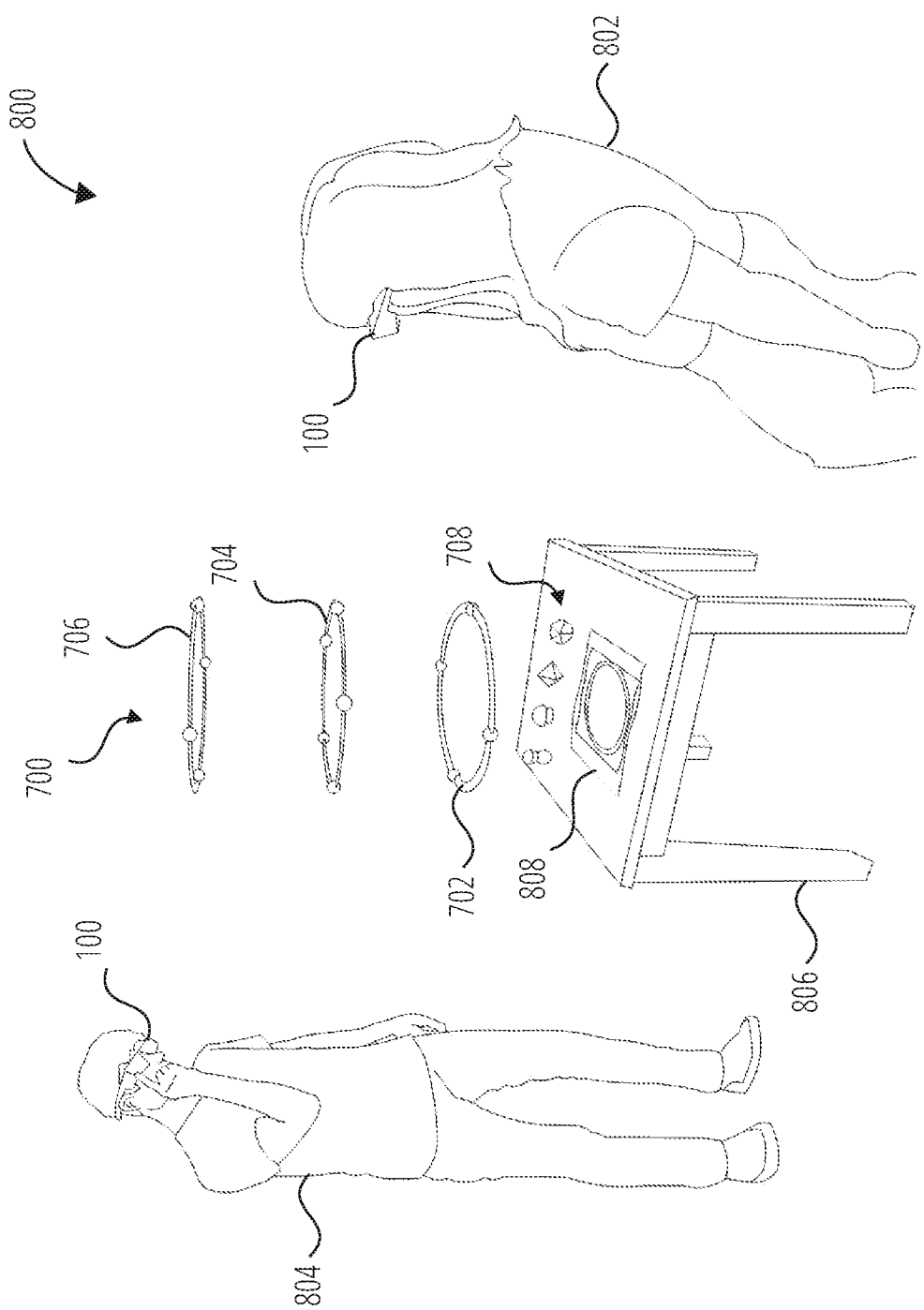
FIG. 8 illustrates a collaborative music creation session as viewed by a participant wearing a head-worn device, in accordance with some examples.

FIG. 8 illustrates a collaborative music composition session 800 as seen by a first participant wearing a head-worn device such as glasses 100. FIG. 8 includes items in the real world that are seen by the first participant, including a second participant 802, a third participant 804, a table 806 and a registration marker 808. Overlaid over the real world elements on the displays 310 of the first participant's glasses 100 is a version of the music creation interface 700, including bottom loop 702, middle loop 704 and note selection interface 708. In FIG. 8, note shapes are yet to be placed on any of the loops.

Before playback, the music creation interface 700 is stationary. In other words, the loops are neither rotating relative to stationary real world objects such as the table nor is a playback indicator rotating around any of the loops.

Each participant has a view of the music creation interface 700 that is dependent on the position of their respective glasses 100. Compared to the composition session 800 viewed by the first participant as illustrated, the second participant 802 is looking at the right hand side of the music creation interface 700 while the third participant 804 is looking at the left hand side of the music creation interface 700. Were the first participant to move to the location of the third participant 804, the music creation interface 700 would rotate in the first participant's field of view so as to appear as fixed relative to the table 806 as if the music creation interface 700 were a real and not a virtual object. Collaboration by the participants is enhanced by providing a single, consistent music creation interface 700 that is located in the same perceived location for all participants.

Creation of this shared frame of reference can be accomplished in a number of ways. In some examples, a registration marker (such as registration marker 808) is placed in a relevant location, such as where the music creation interface 700 is to be used (on top of the table 806 in FIG. 8). One of the glasses 100 (e.g., that of the creator of the shared session) captures an image of the registration marker, which is transmitted to the glasses that are being worn by the other participants. The other glasses also each detect and capture an image of the registration marker. The other glasses 100 then each determine a transformation between the first image and the images that each of the glasses 100. A common coordinate frame is then determined using the transformation, and the shared composition session 800 is generated using the common coordinate frame. The registration marker remains visible to each of the glasses 100, and can be used as a reference to update the pose of each of the glasses 100 as the participants move around in the environment. The view of the music creation interface 700 is then updated to reflect each new pose of the glasses 100.

Other methods may be used to generate the shared frame of reference and, including for example 3D reconstruction and visual inertial odometry based on images captured by each pair of glasses 100 and based on signals or data received from inertial or other positional sensors located in each pair of glasses. Features identified using 3D reconstruction may also be compared with an existing point cloud model to locate and determine the pose of each pair of glasses in the real-world environment.

Once the shared composition session 800 has been established, each participant can manipulate the music creation interface 700 as discussed above with reference to FIG. 5 to FIG. 7.

During playback, the audio generated by the glasses 100 or client device 328 is played back to each user through left and right speakers in or associated with the glasses 100, or via earbuds or headphones. The audio is positioned using known spatial audio techniques so as to appear to be coming from the music creation interface 700 for each participant, based on the pose of the glasses 100 of each participant relative to the perceived location of the music creation interface 700 in the real world.

In some examples the audio is stereo positioning, so that if a participant turns left away from the perceived location of the music creation interface 700, the audio will be panned so as to appear to be coming from the participant's right. In another example, three-dimensional spatial audio can be implemented, so that, for example, if a participant bends their head towards the music creation interface 700, the audio will be perceived to be coming from above their head. In the case of 3D spatial audio, the sounds generated by the notes on each loop can be positioned vertically in the audio scene based on the height of the loop on which each of the notes is located. Also, the level (volume) of the audio can be adjusted based on the distance of a participant from the music creation interface 700, so as to be louder when closer and softer when further away.

Figure 9:
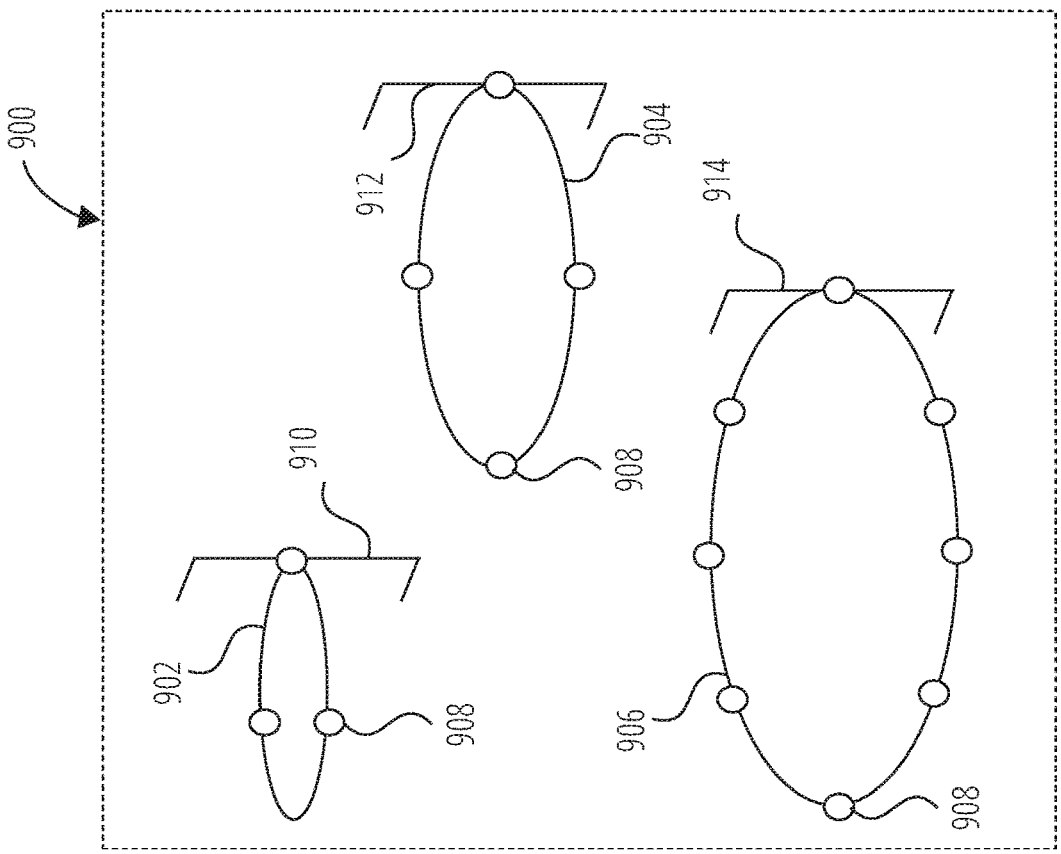
FIG. 9 illustrates an alternative interface for music creation based on the geometric loop illustrated in FIG. 6A and FIG. 6B, in accordance with some examples.

FIG. 9 illustrates an alternative interface for music creation based on the geometric loop illustrated in FIG. 6A and FIG. 6B. In this example, music creation interface 900 comprises three loops that are spaced apart horizontally and that are in the same or different vertical planes, that is located at the same height or different heights above the ground as perceived by the participants in the joint session.

In this example, first loop 902, second loop 904 and third loop 906 each include beat indicators 908 as before, while each loop includes its own play indicator, namely play indicator 910, play indicator 912, play indicator 914 respectively, that will rotate relative to its corresponding loop as discussed above. A composing interface 500 (not shown in FIG. 9), will also be provided as before.

Spatial audio is also be provided in this example, with the sounds from each individual loop being spatialized so as to be perceived to be coming from that loop. In some examples, the loops are selectable by a participant and can be dragged to a new vertical or horizontal position, permitting the creation of an audio scene or soundstage for the different loops.

Figure 10:
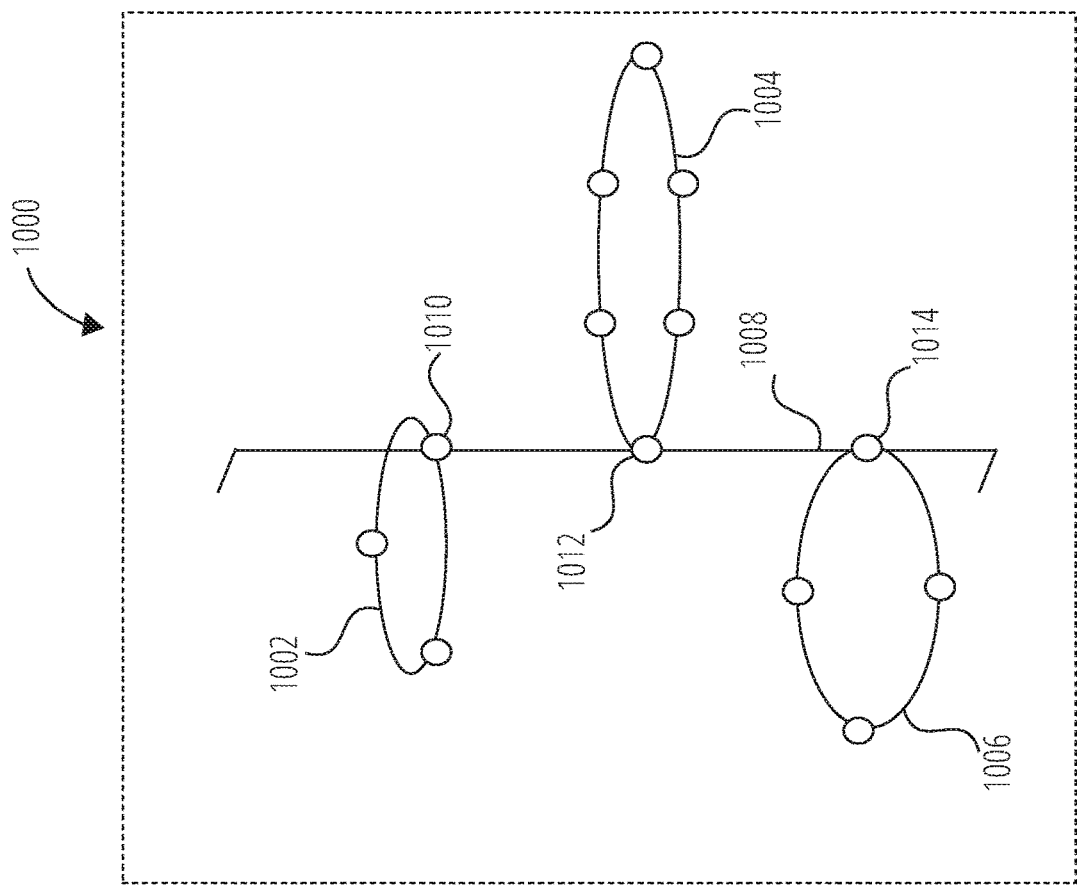
FIG. 10 illustrates a further alternative interface for music creation based on the geometric loop illustrated in FIG. 6A and FIG. 6B, in accordance with some examples.

FIG. 10 illustrates a further alternative interface for music creation based on the geometric loop illustrated in FIG. 6A and FIG. 6B. In this example, music creation interface 1000 comprises three loops that are spaced apart vertically and horizontally with the exception of an intersection with a common vertical play indicator 1008 located at a starting beat indicator for each loop.

In this example, top loop 1002, middle loop 1004, bottom loop 1006, each include multiple beat indicators as before, with a starting beat indicator 1014 for bottom loop 1006 being located directly below a starting beat indicator 1012 for middle loop 1004, which is in turn located directly below a starting beat indicator 1010 for top loop 1002, all being intersected by the common play indicator 1008. When playback is started, the loops may rotate around their individual central axes to maintain their intersection with the common play indicator 1008, or the play indicator 1008 may split into individual play indicators that move around each loop as discussed above with reference to FIG. 6A and FIG. 6B. A composing interface 500 (not shown in FIG. 10), will also be provided as before.

Spatial audio is also be provided in this example, with the sounds from each individual loop being spatialized so as to be perceived to be coming from that loop.

While the playback indicators in the examples of FIG. 9 and FIG. 10 are animating pieces of geometry—a vertical bar that is animated around the loops to indicate active playback, in another example, a visual effect could be provided over the loops, such as a material shader that animates over the top of the loop's geometry or on the note shapes as the play indicator, to indicate active moving time on top of the loop geometry or the note shapes.

Figure 11:
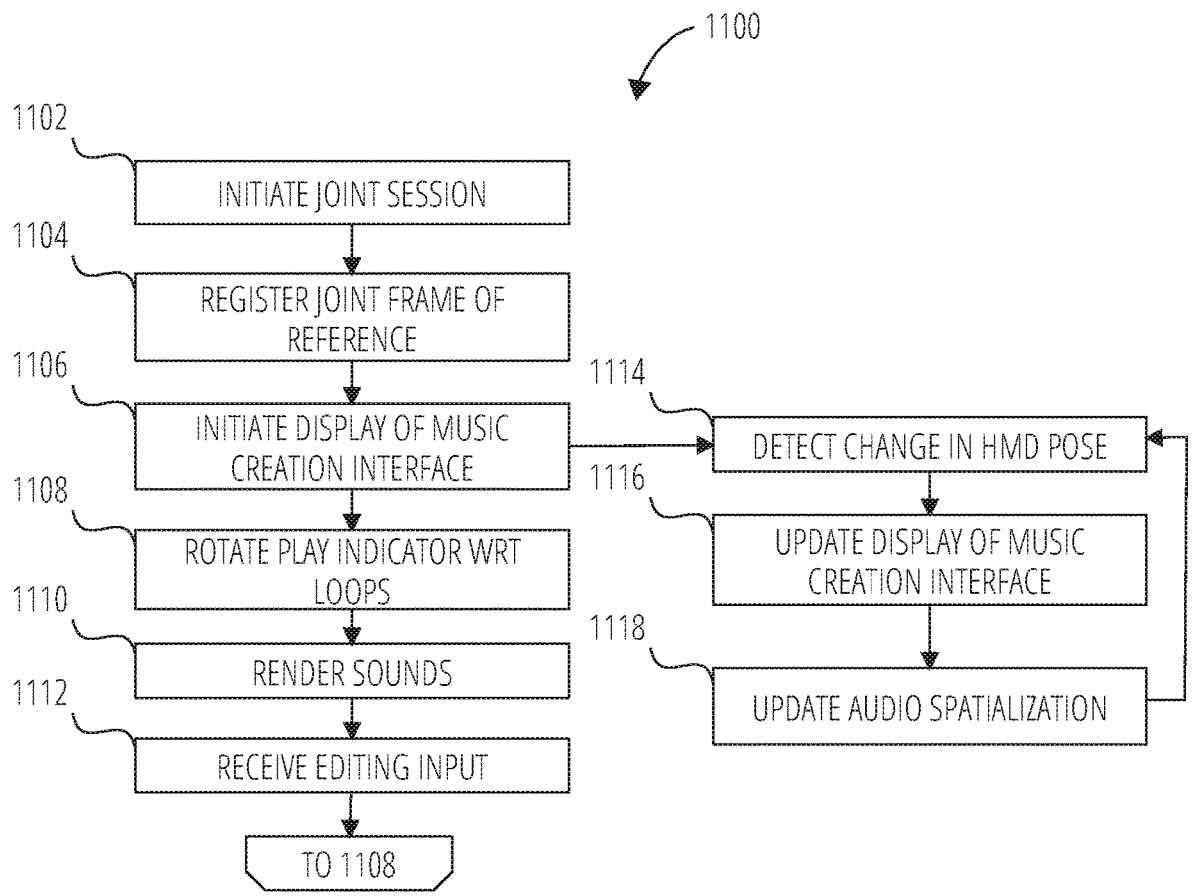
FIG. 11 is a flowchart illustrating operations performed by a head-worn device to provide or facilitate a shared music creation interface according to some examples.

FIG. 11 is a flowchart 1100 illustrating operations performed by glasses 100 to provide or facilitate a shared music creation interface according to some examples. For explanatory purposes, the operations of the flowchart 1100 are described herein as occurring in serial, or linearly. However, multiple operations of the flowchart 1100 may occur in parallel. In addition, the operations of the flowchart 1100 need not be performed in the order shown and/or one or more blocks of the flowchart 1100 need not be performed and/or can be replaced by other operations.

The operations illustrated in FIG. 11 will typically execute on the data processor 302 and associated hardware in or associated with the glasses 100. For the purposes of clarity, flowchart 1100 is discussed herein with reference to such an example. Various implementations are of course possible, with some of the operations taking place in client device 328 in an application such as messaging application 1346, on server system 332, or with one application on the client device 328 calling another application or SDK for required functionality. In some examples, the operations are performed jointly between messaging application 1346 running on the client device 328 and the data processor 302 and associated hardware in or associated with the glasses 100.

The method starts at operation 1102 with initiation by the respective glasses 100 or client device 328 of a joint session involving all of the participants. The joint session may be initiated in response to an invitation transmitted by one of the participants from their client device 328 or glasses 100 to their friends or connections, or may be in response to a prompt that is triggered upon the detection of the proximity between the client devices 328 or glasses 100 of users who are friends or connections to each other, and are either at or near enough to be able to join in a reasonable time.

A joint frame of reference between the glasses 100 of the participants is then registered in operation 1104. In some examples discussed in more detail above, this is done with reference to a registration marker 808 that has been placed in a convenient location.

Display of the music creation interface in the field of view of the participants' glasses is then initiated in operation 1106. In some cases, a default arrangement of geometric loops 602 and beat indicators 610 is displayed (including number of loops, spatial arrangement of loops, number of beat indicators on each loop and so forth), or a preferred initial arrangement or an in-process or existing composition can be loaded for editing or playback in response to user selection of existing defaults or compositions. In the case of a default arrangement, the number of beat indicators 610 on a particular geometric loop 602 can be adjusted by selecting a particular geometric loop 602 using the reticle 720 and adjusting its properties. Included in the display of the creation interface is a note selection interface 708 comprising a plurality of sound or note icons, in some examples in the form of the note shapes discussed above with reference to FIG. 6A, FIG. 6B and FIG. 7.

In operation 1114 and operation 1116 each of the participants' glasses 100 update their display of the creation interface based on detecting a change in their relative poses in the fixed frame of reference, and compared to the music creation interface. Additionally, if any sounds or notes are being rendered, the spatialization of the corresponding audio is updated for a corresponding participant based on the change in pose of the particular participant's glasses 100 in operation 1118. This process is ongoing.

In operation 1108, rotation of the geometric loops and at least one play indicator in the display of the music creation interface relative to each other commences as described above with reference to FIG. 6A and FIG. 6B. In the example of flowchart 1100, playback rotation occurs continuously to provide a dynamic creation experience, with the rendered sounds being updated as note shapes are added and removed and as their corresponding beat indicator is reached by a playback indicator. In this example, the loops are held stationary with respect to the frame of reference in the real world while the playback indicator(s) move around the loop, to permit easier positioning of note shapes on (stationary) beat indicators.

In operation 1110, sounds or notes corresponding to sound or note icons are rendered when the at least one play indicator is at the particular beat indicator or the selected sound or note icon.

In operation 1112, editing user inputs are received by the glasses 100 to create or modify a creation. This can include receiving input corresponding to the selection and movement of a sound or note icon to a particular beat indicator on a particular geometric loop 602, the removal of a sound or note icon from its position on a particular geometric loop 602, the rearrangement of sound or note icons on or between geometric loops 602, and so forth. In response to receiving such inputs, the music creation interface is updated accordingly and the method returns to operation 1108 and playback and any editing continues.

At any time one or more of the participants may provide input to leave the joint session, and discard, save to, or delete the composition from, a repository associated with the particular participant, locally or in one of the application servers 414. Additionally, a participant may provide input to share the composition. Upon receipt of a Save, Delete or Share input, the corresponding action is taken. In some examples, the composition may be shared via a message composed in a chat interface of a messaging application and sent to one or more of a participant's connections or friends. In another example, the composition may be posted on a feed on a social networking site that is associated with the user.

Figure 12:
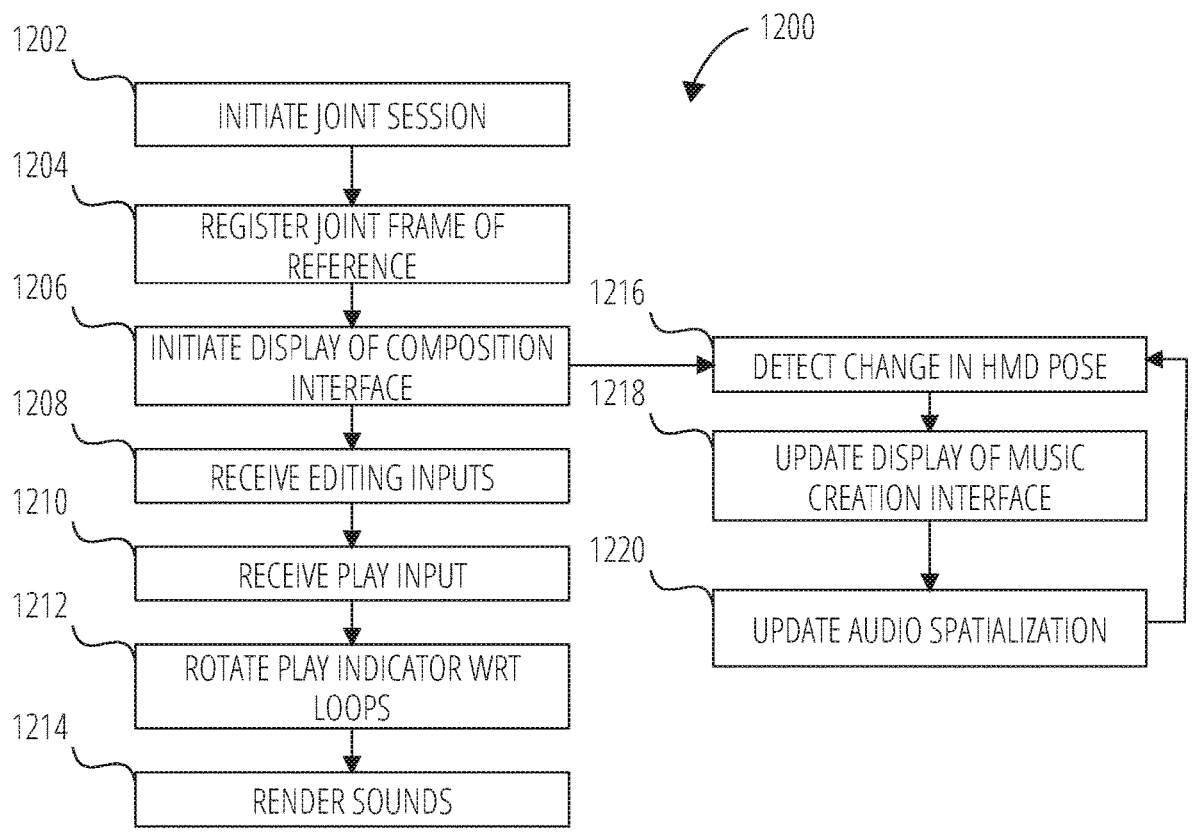
FIG. 12 is a flowchart illustrating operations performed by a head-worn device to provide or facilitate a shared music creation interface according to some examples.

FIG. 12 is a flowchart 1200 illustrating operations performed by glasses 100 to provide or facilitate a shared music creation interface according to some examples. For explanatory purposes, the operations of the flowchart 1200 are described herein as occurring in serial, or linearly. However, multiple operations of the flowchart 1200 may occur in parallel. In addition, the operations of the flowchart 1200 need not be performed in the order shown and/or one or more blocks of the flowchart 1200 need not be performed and/or can be replaced by other operations.

The operations illustrated in FIG. 12 will typically execute on the data processor 302 and associated hardware in or associated with the glasses 100. For the purposes of clarity, flowchart 1200 is discussed herein with reference to such an example. Various implementations are of course possible, with some of the operations taking place in client device 328 in an application such as messaging application 1346, on server system 332, or with one application on the client device 328 calling another application or SDK for required functionality. In some examples, the operations are performed jointly between messaging application 1346 running on the client device 328 and the data processor 302 and associated hardware in or associated with the glasses 100.

The method starts at operation 1202 with initiation by the respective glasses 100 or client device 328 of a joint session involving all of the participants. The joint session may be initiated in response to an invitation transmitted by one of the participants from their client device 328 or glasses 100 to their friends or connections, or may be in response to a prompt that is triggered upon the detection of the proximity between the client devices 328 or glasses 100 of users who are friends or connections to each other, and are either at or near enough to be able to join in a reasonable time.

A joint frame of reference between the glasses 100 of the participants is then registered in operation 1204. In some examples discussed in more detail above, this is done with reference to a registration marker 808 that has been placed in a convenient location.

Display of the music creation interface in the field of view of the participants' glasses is then initiated in operation 1206. In some cases, a default arrangement of geometric loops 602 and beat indicators 610 is displayed (including number of loops, spatial arrangement of loops, number of beat indicators on each loop and so forth), or a preferred initial arrangement or an in-process or existing composition can be loaded for editing or playback in response to user selection of existing defaults or compositions. In the case of a default arrangement, the number of beat indicators 610 on a particular geometric loop 602 can be adjusted by selecting a particular geometric loop 602 using the reticle 720 and adjusting its properties. Included in the display of the creation interface is a note selection interface 708 comprising a plurality of sound or note icons, in some examples in the form of the note shapes discussed above with reference to FIG. 6A, FIG. 6B and FIG. 7.

In operation 1216 and operation 1218 each of the participants glasses 100 update their display of the creation interface based on detecting a change in their relative poses in the fixed frame of reference, and compared to the music creation interface. Additionally, if any sounds or notes are being rendered, the spatialization of the corresponding audio is updated for a corresponding participant based on the change in pose of the particular participant's glasses 100 in operation 1220. This process is ongoing.

In operation 1208, editing user inputs are received by the glasses 100 to create or modify a composition. This can include receiving input corresponding to the selection and movement of a sound or note icon to a particular beat indicator on a particular geometric loop 602, the removal of a sound or note icon from its position on a particular geometric loop 602, the rearrangement of sound or note icons on or between geometric loops 602, and so forth. In response to receiving such inputs, the music creation interface is updated accordingly.

In some examples, user selection of a play input is then received at one of the participants' glasses 100 in operation 1210. In response in operation 1212, the geometric loops and at least one play indicator in the display of the music creation interface are rotated relative to each other as described above with reference to FIG. 6A and FIG. 6B, and sounds or notes corresponding to the sound or note icons are rendered in block 1214 when the at least one play indicator is at the particular beat indicator or the selected sound or note icon. The relative rotation of the play indicator(s) and geometric loops continue until a stop user input is received, at which time the method returns to operation 1208 or operation 1210 to receive further editing or play inputs.

At any time one or more of the participants may provide input to leave the joint session, and discard, save to, or delete the composition from, a repository associated with the particular participant, locally or in one of the application servers 414. Additionally, a participant may provide input to share the composition. Upon receipt of a Save, Delete or Share input, the corresponding action is taken. In some examples, the composition may be shared via a message composed in a chat interface of a messaging application and sent to one or more of a participant's connections or friends. In another example, the composition may be posted on a feed on a social networking site that is associated with the user.

Figure 13:
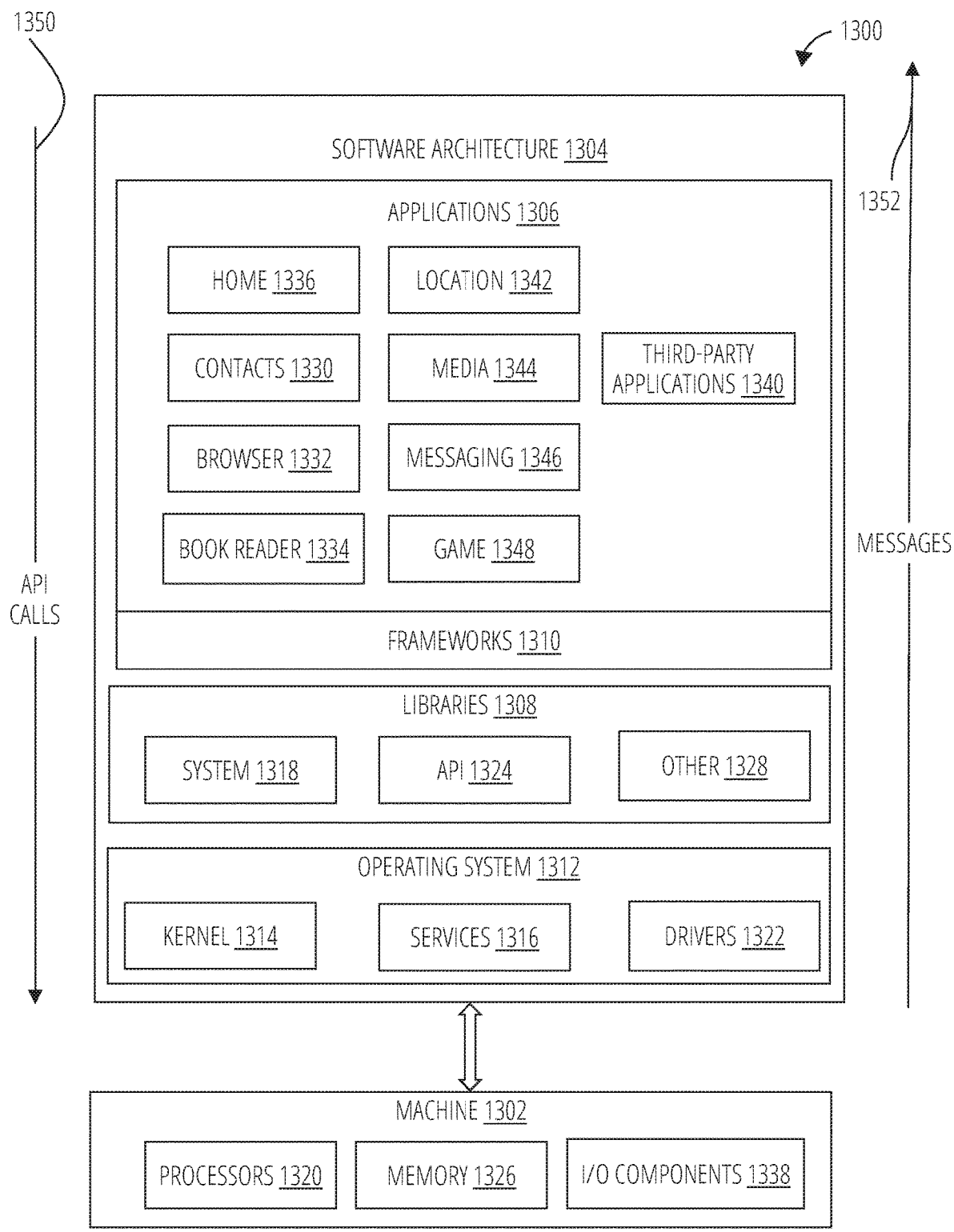
FIG. 13 is block diagram showing a software architecture within which the present disclosure may be implemented, in accordance with some examples.

FIG. 13 is a block diagram 1300 illustrating a software architecture 1304, which can be installed on any one or more of the devices described herein. The software architecture 1304 is supported by hardware such as a machine 1302 that includes processors 1320, memory 1326, and I/O components 1338. In this example, the software architecture 1304 can be conceptualized as a stack of layers, where each layer provides a particular functionality. The software architecture 1304 includes layers such as an operating system 1312, libraries 1308, frameworks 1310, and applications 1306. Operationally, the applications 1306 invoke API calls 1350 through the software stack and receive messages 1352 in response to the API calls 1350.

The operating system 1312 manages hardware resources and provides common services. The operating system 1312 includes, for example, a kernel 1314, services 1316, and drivers 1322. The kernel 1314 acts as an abstraction layer between the hardware and the other software layers. For example, the kernel 1314 provides memory management, processor management (e.g., scheduling), component management, networking, and security settings, among other functionality. The services 1316 can provide other common services for the other software layers. The drivers 1322 are responsible for controlling or interfacing with the underlying hardware. For instance, the drivers 1322 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 1308 provide a low-level common infrastructure used by the applications 1306. The libraries 1308 can include system libraries 1318 (e.g., C standard library) that provide functions such as memory allocation functions, string manipulation functions, mathematic functions, and the like. In addition, the libraries 1308 can include API libraries 1324 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1308 can also include a wide variety of other libraries 1328 to provide many other APIs to the applications 1306.

The frameworks 1310 provide a high-level common infrastructure that is used by the applications 1306. For example, the frameworks 1310 provide various graphical user interface (GUI) functions, high-level resource management, and high-level location services. The frameworks 1310 can provide a broad spectrum of other APIs that can be used by the applications 1306, some of which may be specific to a particular operating system or platform.

In an example, the applications 1306 may include a home application 1336, a contacts application 1330, a browser application 1332, a book reader application 1334, a location application 1342, a media application 1344, a messaging application 1346, a game application 1348, and a broad assortment of other applications such as third-party applications 1340. The applications 1306 are programs that execute functions defined in the programs. Various programming languages can be employed to create one or more of the applications 1306, structured in a variety of manners, such as object-oriented programming languages (e.g., Objective-C, Java, or C++) or procedural programming languages (e.g., C or assembly language). In a specific example, the third-party applications 1340 (e.g., applications developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party applications 1340 can invoke the API calls 1350 provided by the operating system 1312 to facilitate functionality described herein.

Figure 14:
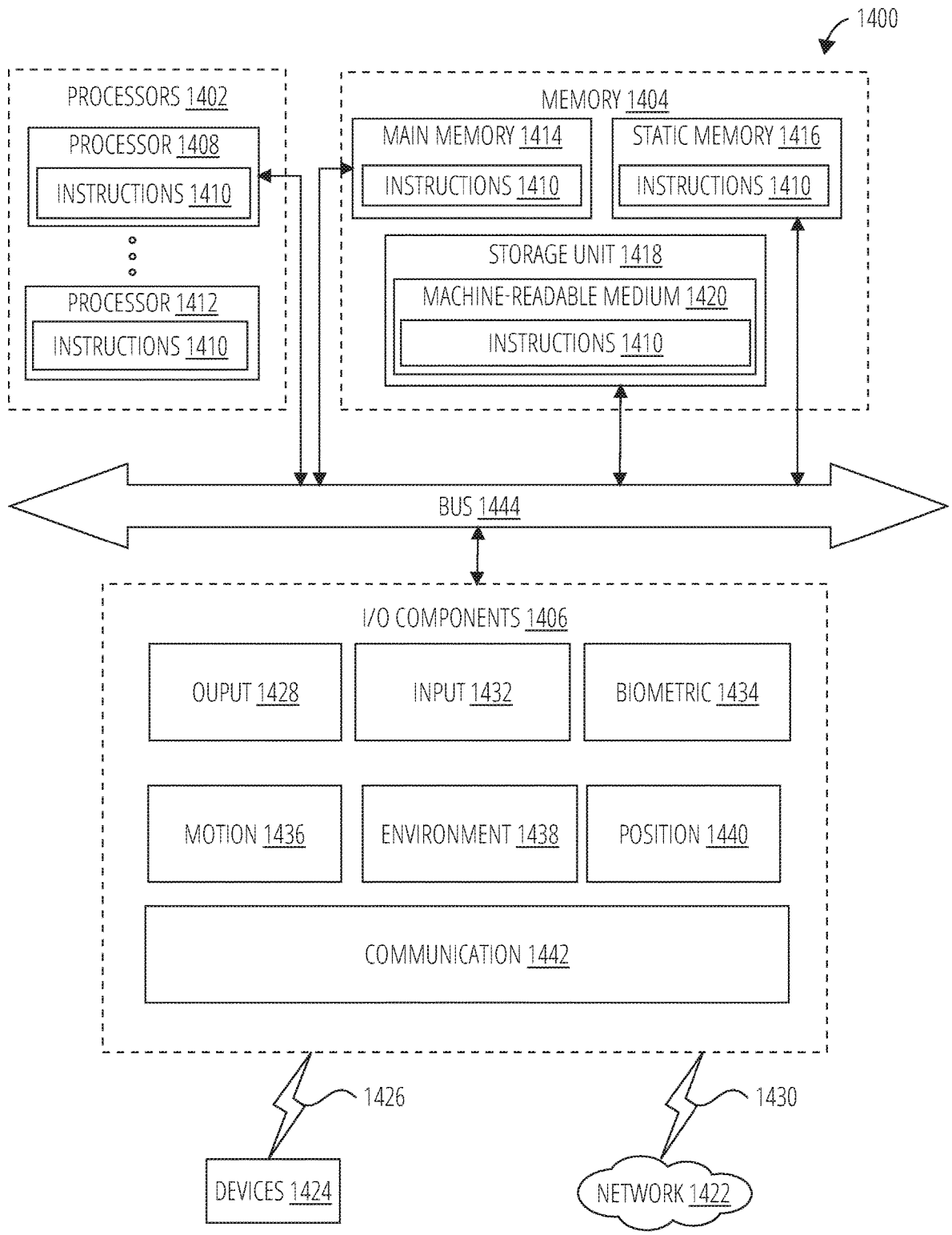
FIG. 14 is a diagrammatic representation of a machine, in the form of a computer system within which a set of instructions may be executed for causing the machine to perform any one or more of the methodologies discussed, in accordance with some examples.

FIG. 14 is a diagrammatic representation of a machine 1400 within which instructions 1410 (e.g., software, a program, an application, an applet, an app, or other executable code) for causing the machine 1400 to perform any one or more of the methodologies discussed herein may be executed. For example, the instructions 1410 may cause the machine 1400 to execute any one or more of the methods described herein. The instructions 1410 transform the general, non-programmed machine 1400 into a particular machine 1400 programmed to carry out the described and illustrated functions in the manner described. The machine 1400 may operate as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a head-worn device (e.g., a smart watch), a smart home device (e.g., a smart appliance), other smart devices, a web appliance, a network router, a network switch, a network bridge, or any machine capable of executing the instructions 1410, sequentially or otherwise, that specify actions to be taken by the machine 1400. Further, while only a single machine 1400 is illustrated, the term "machine" shall also be taken to include a collection of machines that individually or jointly execute the instructions 1410 to perform any one or more of the methodologies discussed herein.

The machine 1400 may include processors 1402, memory 1404, and I/O components 1406, which may be configured to communicate with each other via a bus 1444. In an example, the processors 1402 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1408 and a processor 1412 that execute the instructions 1410. The term "processor" is intended to include multi-core processors that may comprise two or more independent processors (sometimes referred to as "cores") that may execute instructions contemporaneously. Although FIG. 14 shows multiple processors 1402, the machine 1400 may include a single processor with a single core, a single processor with multiple cores (e.g., a multi-core processor), multiple processors with a single core, multiple processors with multiples cores, or any combination thereof.

The memory 1404 includes a main memory 1414, a static memory 1416, and a storage unit 1418, both accessible to the processors 1402 via the bus 1444. The main memory 1404, the static memory 1416, and storage unit 1418 store the instructions 1410 embodying any one or more of the methodologies or functions described herein. The instructions 1410 may also reside, completely or partially, within the main memory 1414, within the static memory 1416, within machine-readable medium 1420 within the storage unit 1418, within at least one of the processors 1402 (e.g., within the processor's cache memory), or any suitable combination thereof, during execution thereof by the networked system 300.

The I/O components 1406 may include a wide variety of components to receive input, provide output, produce output, transmit information, exchange information, capture measurements, and so on. The specific I/O components 1406 that are included in a particular machine will depend on the type of machine. For example, portable machines such as mobile phones may include a touch input device or other such input mechanisms, while a headless server machine will likely not include such a touch input device. It will be appreciated that the I/O components 1406 may include many other components that are not shown in FIG. 14. In various examples, the I/O components 1406 may include output components 1428 and input components 1432. The output components 1428 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1432 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further examples, the I/O components 1406 may include biometric components 1434, motion components 1436, environmental components 1438, or position components 1440, among a wide array of other components. For example, the biometric components 1434 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1436 include acceleration sensor components (e.g., accelerometer), gravitation sensor components, rotation sensor components (e.g., gyroscope), and so forth. The environmental components 1438 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1440 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1406 further include communication components 1442 operable to couple the networked system 300 to a network 1422 or devices 1424 via a coupling 1430 and a coupling 1426, respectively. For example, the communication components 1442 may include a network interface component or another suitable device to interface with the network 1422. In further examples, the communication components 1442 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1424 may be another machine or any of a wide variety of peripheral devices (e.g., a peripheral device coupled via a USB).

Moreover, the communication components 1442 may detect identifiers or include components operable to detect identifiers. For example, the communication components 1442 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1442, such as location via Internet Protocol (IP) geolocation, location via Wi-Fi® signal triangulation, location via detecting an NFC beacon signal that may indicate a particular location, and so forth.

The various memories (e.g., memory 1404, main memory 1414, static memory 1416, and/or memory of the processors 1402) and/or storage unit 1418 may store one or more sets of instructions and data structures (e.g., software) embodying or used by any one or more of the methodologies or functions described herein. These instructions (e.g., the instructions 1410), when executed by processors 1402, cause various operations to implement the disclosed examples.

The instructions 1410 may be transmitted or received over the network 1422, using a transmission medium, via a network interface device (e.g., a network interface component included in the communication components 1442) and using any one of a number of well-known transfer protocols (e.g., hypertext transfer protocol (HTTP)). Similarly, the instructions 1410 may be transmitted or received using a transmission medium via the coupling 1426 (e.g., a peer-to-peer coupling) to the devices 1424.

A "carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

A "client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

A "communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

A "component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

A "computer-readable medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

An "ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

A "machine-storage medium" refers to a single or multiple storage devices and/or media (e.g., a centralized or distributed database, and/or associated caches and servers) that store executable instructions, routines and/or data. The term shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

A "processor" refers to any circuit or virtual circuit (a physical circuit emulated by logic executing on an actual processor) that manipulates data values according to control signals (e.g., "commands", "op codes", "machine code", and so forth) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

A "signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed examples without departing from the scope of the present disclosure. These and other changes or modifications are intended to be included within the scope of the present disclosure, as expressed in the following claims.

What is claimed is:

1. A method of providing a music creation interface, executed by one or more processors in a head-worn device system including one or more display devices, comprising:
    displaying a first geometric loop fixed relative to a location in a real world environment, the first geometric loop including a plurality of beat indicators;
    displaying a second geometric loop fixed relative to the location in the real world environment, the second geometric loop including a plurality of beat indicators and being spaced apart from the first geometric loop, the first geometric loop and the second geometric loop being in a vertically stacked configuration at the location and sharing a common rotational axis;
    displaying an interface comprising a plurality of different audio icons;
    receiving user selection to move a selected audio icon of the plurality of different audio icons to a particular beat indicator on at least one of the first and second geometric loops; and
    displaying the selected audio icon at the particular beat indicator.

2. The method of claim 1 further comprising:
rotating the first and second geometric loops and at least one play indicator relative to each other around the common rotational axis; and
rendering a sound or note corresponding to the selected audio icon when the at least one play indicator is at the particular beat indicator or the selected audio icon of each of the first and second geometric loops.

3. The method of claim 2 wherein the at least one play indicator remains stationary relative to the location in the real world environment while the first and second geometric loops rotate relative to the location in the real world environment and around the common rotational axis.

4. The method of claim 2 wherein the first and second geometric loops remain stationary relative to the location in the real world environment while the at least one play indicator moves around the geometric loops around the common rotational axis.

5. The method of claim 1, further comprising:
initiating a joint augmented reality session between a first head-mounted device and a second head-mounted device;
displaying the first geometric loop via the first head-mounted device and the second head-mounted device in a fixed frame of reference fixed relative to the location in the real world environment;
displaying the second geometric loop via the first head-mounted device and the second head-mounted device in the fixed frame of reference fixed relative to the location in the real world environment;
detecting movement of the first head-mounted device and the second head-mounted device; and
updating the display of the first geometric loop and the second geometric loop to account for the movement of the first head-mounted device and the second head-mounted device such that the first geometric loop and the second geometric loop appear to be stationary in the fixed frame of reference.

6. The method of claim 2 wherein the at least one play indicator comprises a common vertical play indicator.

7. The method of claim 2, further comprising:
changing a volume of the rendering of the audio depending on a perceived distance between the music creation interface and the head-worn device system.

8. The method further of claim 7, further comprising panning the rendering of the audio depending on a relative orientation between the music creation interface and the head-worn device system.

9. A head-worn device system comprising:
one or more cameras;
one or more display devices;
one or more processors; and
a memory storing instructions that, when executed by the one or more processors, configure the system to perform operations to provide a music creation interface, comprising:
displaying a first geometric loop fixed relative to a location in a real world environment, the first geometric loop including a plurality of beat indicators;
displaying a second geometric loop fixed relative to the location in the real world environment, the second geometric loop including a plurality of beat indicators and being spaced apart from the first geometric loop, the first geometric loop and the second geometric loop being in a vertically stacked configuration at the location and sharing a common rotational axis;
displaying an interface comprising a plurality of different audio icons;
receiving user selection to move a selected audio icon to a particular beat indicator on least one of the first and second geometric loops; and
displaying the selected audio icon at the particular beat indicator.

10. The head-worn device system of claim 9 wherein the operations further comprise:
rotating the first and second geometric loops and at least one play indicator relative to each other around the common rotational axis; and
rendering audio corresponding to the selected audio icon when the at least one play indicator is at the particular beat indicator or the selected audio icon.

11. The head-worn device system of claim 10 wherein the first and second geometric loops remain stationary relative to the location in the real world environment while the at least one play indicator moves around the geometric loops around the common rotational axis.

12. The head-worn device system of claim 9 wherein the operations further comprise:
initiating a joint augmented reality session between a first head-mounted device and a second head-mounted device;
displaying the first geometric loop via the first head-mounted device and the second head-mounted device in a fixed frame of reference fixed relative to the location in the real world environment;
displaying the second geometric loop via the first head-mounted device and the second head-mounted device in the fixed frame of reference fixed relative to the location in the real world environment;
detecting movement of the first head-mounted device and the second head-mounted device; and
updating the display of the first geometric loop and the second geometric loop to account for the movement of the first head-mounted device and the second head-mounted device such that the first geometric loop and the second geometric loop appear to be stationary in the fixed frame of reference.

13. The head-worn device system of claim 10 wherein the operations further comprise:
determining a relative position and orientation between the music creation interface and the head-worn device system; and
rendering audio corresponding to the selected audio icon in at least two speakers based on the relative position and orientation of the music creation interface and the head-worn device system.

14. The head-worn device system of claim 10 wherein the at least one play indicator comprises a common vertical play indicator.

15. A non-transitory computer-readable storage medium, the computer-readable storage medium including instructions that when executed by a head-worn device system including one or more display devices, cause the head-worn device system to perform operations to provide a music creation interface, comprising:
displaying a first geometric loop fixed relative to a location in a real world environment, the first geometric loop including a plurality of beat indicators;
displaying a second geometric loop fixed relative to the location in the real world environment, the second geometric loop including a plurality of beat indicators and being spaced apart from the first geometric loop, the first geometric loop and the second geometric loop being in a vertically stacked configuration at the location and sharing a common rotational axis;

displaying an interface comprising a plurality of different audio icons;

receiving user selection to move a selected audio icon of the plurality of different audio icons to a particular beat indicator on at least one of the first and second geometric loops; and displaying the selected audio icon at the particular beat indicator.

16. The non-transitory computer-readable storage medium of claim 15 wherein the operations further comprise:

rotating the first and second geometric loops and at least one play indicator relative to each other around the common rotational axis; and rendering audio corresponding to the selected audio icon when the at least one play indicator is at the particular beat indicator or the selected audio icon.

17. The non-transitory computer-readable storage medium of claim 16 wherein the first and second geometric loops remain stationary relative to the location in the real world environment while the at least one play indicator moves around the geometric loops around the common rotational axis.

18. The non-transitory computer-readable storage medium of claim 15 wherein the operations further comprise:

initiating a joint augmented reality session between a first head-mounted device and a second head-mounted device;

displaying the first geometric loop via the first head-mounted device and the second head-mounted device in a fixed frame of reference fixed relative to the location in the real world environment;

displaying the second geometric loop via the first head-mounted device and the second head-mounted device in the fixed frame of reference fixed relative to the location in the real world environment;

detecting movement of the first head-mounted device and the second head-mounted device; and updating the display of the first geometric loop and the second geometric loop to account for the movement of the first head-mounted device and the second head-mounted device such that the first geometric loop and the second geometric loop appear to be stationary in the fixed frame of reference.

19. The non-transitory computer-readable storage medium of claim 16 wherein the at least one play indicator comprises a common vertical play indicator.

20. The non-transitory computer-readable storage medium of claim 16 wherein the operations further comprise:

changing a volume of the rendering of the audio depending on a perceived distance between the music creation interface and the head-worn device system.

* * * * *